US012803196B2

(12) United States Patent
Huang et al.

(10) Patent No.: US 12,803,196 B2
(45) Date of Patent: Nov. 17, 2026

(54) CONNECTOR ASSEMBLY COMPRISING A CONDUCTIVE TERMINAL TO PROVIDE SHIELDING FOR ANOTHER CONDUCTIVE TERMINAL

(71) Applicant: Tarng Yu Enterprise co., ltd., New Taipei City (TW)

(72) Inventors: Mu-Jung Huang, New Taipei City (TW); Ying-Chung Chen, New Taipei City (TW)

(73) Assignee: TARNG YU ENTERPRISE CO., LTD., New Taipei City (TW)

( * ) Notice: Subject to any disclaimer, the term of this patent is extended or adjusted under 35 U.S.C. 154(b) by 453 days.

(21) Appl. No.: 18/078,521

(22) Filed: Dec. 9, 2022

(65) Prior Publication Data

US 2023/0187863 A1 Jun. 15, 2023

(30) Foreign Application Priority Data

Dec. 9, 2021 (TW) ................................ 110146191

(51) Int. Cl.
*H01R 12/73* (2011.01)
*H01R 12/70* (2011.01)
(Continued)

(52) U.S. Cl.
CPC ......... *H01R 12/73* (2013.01); *H01R 12/7005* (2013.01); *H01R 12/716* (2013.01); *H01R 12/72* (2013.01); *H01R 12/727* (2013.01); *H01R 12/735* (2013.01); *H01R 12/737* (2013.01); *H01R 13/2407* (2013.01);
(Continued)

(58) Field of Classification Search
CPC .. H01R 12/7005; H01R 12/57; H01R 12/716; H01R 12/73; H01R 13/02; H01R 13/2407; H01R 13/40; H01R 13/405; H01R 13/629; H01R 13/6471; H01R 13/6582; H01R 13/6585; H01R 12/55; H01R 12/59; H01R 12/592; H01R 12/70; H01R 12/7011; H01R 12/707; H01R 12/71; H01R 12/712; H01R 12/72; H01R 12/721; H01R 12/727; H01R 12/735; H01R 12/737; H01R 13/2442; H01R 13/6474; H01R 13/648; H01R 13/6473; H01R 13/6477; H01R 13/652; H01R 13/112; H01R 13/24
See application file for complete search history.

(56) References Cited

U.S. PATENT DOCUMENTS 8,342,888 B2 * 1/2013 Amleshi ............. H01R 13/658
439/660
11,239,609 B2 * 2/2022 Tang ...................... H01R 13/50
(Continued)

*Primary Examiner* — Justin M Kratt
(74) *Attorney, Agent, or Firm* — LANWAY IPR SERVICES; Chun-Ming Shih

(57) ABSTRACT

A connector assembly is provided. The connector assembly allows a conductive terminal to provide shielding to reduce any effect of external interference on signal transmission of the connector assembly so as to meet signal transmission requirements for the connector assembly, and with the use of a jumper conductor, at least partial conductive terminals on the connector assembly can be electrically interconnected with no need of any additional jumper, such that an electronic device using such connector assembly can be made compact in size desirably.

1 Claim, 23 Drawing Sheets

A-A

(51) Int. Cl.

| | |
|---|---|
| ***H01R 12/71*** | (2011.01) |
| ***H01R 12/72*** | (2011.01) |
| ***H01R 13/24*** | (2006.01) |
| ***H01R 13/40*** | (2006.01) |
| ***H01R 13/629*** | (2006.01) |
| ***H01R 13/6471*** | (2011.01) |
| ***H01R 13/6473*** | (2011.01) |
| ***H01R 13/6474*** | (2011.01) |
| ***H01R 13/6477*** | (2011.01) |
| ***H01R 13/652*** | (2006.01) |
| ***H01R 13/6582*** | (2011.01) |
| *H01R 12/55* | (2011.01) |
| *H01R 12/57* | (2011.01) |
| *H01R 12/59* | (2011.01) |
| *H01R 13/02* | (2006.01) |
| *H01R 13/11* | (2006.01) |
| *H01R 13/405* | (2006.01) |
| *H01R 13/648* | (2006.01) |
| *H01R 13/6585* | (2011.01) |

(52) U.S. Cl.

CPC ........... *H01R 13/40* (2013.01); *H01R 13/629* (2013.01); *H01R 13/6471* (2013.01); *H01R 13/6473* (2013.01); *H01R 13/6474* (2013.01); *H01R 13/6477* (2013.01); *H01R 13/652* (2013.01); *H01R 13/6582* (2013.01); *H01R 12/55* (2013.01); *H01R 12/57* (2013.01); *H01R 12/59* (2013.01); *H01R 12/592* (2013.01); *H01R 12/70* (2013.01); *H01R 12/7011* (2013.01); *H01R 12/707* (2013.01); *H01R 12/71* (2013.01); *H01R 12/712* (2013.01); *H01R 12/721* (2013.01); *H01R 13/02* (2013.01); *H01R 13/112* (2013.01); *H01R 13/24* (2013.01); *H01R 13/2442* (2013.01); *H01R 13/405* (2013.01); *H01R 13/648* (2013.01); *H01R 13/6585* (2013.01)

(56) References Cited

U.S. PATENT DOCUMENTS

| | | | | |
|---|---|---|---|---|
| 2014/0310957 | A1* | 10/2014 | Buck .................. | H01R 13/6461 29/882 |
| 2019/0214755 | A1* | 7/2019 | Manickam ........... | H01R 12/721 |
| 2023/0066802 | A1* | 3/2023 | Tseng ................... | H01R 12/724 |

* cited by examiner

CONNECTOR ASSEMBLY COMPRISING A CONDUCTIVE TERMINAL TO PROVIDE SHIELDING FOR ANOTHER CONDUCTIVE TERMINAL

CROSS-REFERENCE TO RELATED APPLICATIONS

This application claims the priority of Republic of China Patent Application No. 110146191 filed on Dec. 9, 2021, in the State Intellectual Property Office of the R.O.C., the disclosure of which is incorporated herein by reference.

BACKGROUND OF THE INVENTION

Field of the Invention

The present invention relates to electronic devices, and more particularly, to a connector assembly capable of providing shielding for a conductive terminal to fulfill signal transmission requirements.

Descriptions of the Related Art

Connector assembly has been applied massively to various electronic devices nowadays, and increasingly play an important role in signal transmission in response to distinct requirements and innovations of the electronic devices. Currently available connector assembly, however, do not provide good shielding due to the structural design thereof, and signals transmitted by the connector assembly are usually affected by external interference that causes signal fading and distortion during transmission, thereby making the connector assembly fail to meet signal transmission requirements.

Therefore, how to make connector assembly that can provide satisfactory shielding to protect signal transmission from external disturbance, is an important task in the art.

SUMMARY OF THE INVENTION

In view of the above drawbacks in the prior art, the present invention provides connector assembly for being coupled to a coupling component and bonded to a bonding component, the coupling component having a coupling portion, and the bonding component having a bonding portion, the connector assembly including: a primary terminal set, with a primary terminal set projection plane being defined, the primary terminal set including at least one primary first conductive terminal and at least one primary second conductive terminal, wherein the primary first conductive terminal has a primary first conductive terminal coupling structure and a primary first conductive terminal bonding structure, and the primary second conductive terminal has a primary second conductive terminal coupling structure and a primary second conductive terminal bonding structure; and an inner insulation terminal block including an inner insulation terminal block primary first positioning structure and an inner insulation terminal block primary second positioning structure, wherein, the inner insulation terminal block primary first positioning structure is for positioning the primary first conductive terminal in a manner that the primary first conductive terminal is held at a predetermined position and extended in a direction parallel to the primary terminal set projection plane, so as to allow the primary first conductive terminal coupling structure to be coupled to the coupling portion of the coupling component and allow the primary first conductive terminal bonding structure to be bonded to the bonding portion of the bonding component; the inner insulation terminal block primary second positioning structure is for positioning the primary second conductive terminal in a manner that the primary second conductive terminal is held at a predetermined position and extended in a direction parallel to the primary terminal set projection plane, so as to allow the primary second conductive terminal coupling structure to be coupled to the coupling portion of the coupling component and allow the primary second conductive terminal bonding structure to be bonded to the bonding portion of the bonding component; and the primary first conductive terminal has a primary first conductive terminal projection area on the primary terminal set projection plane, and the primary second conductive terminal has a primary second conductive terminal projection area on the primary terminal set projection plane, wherein the primary second conductive terminal projection area is larger than the primary first conductive terminal projection area to allow the primary second conductive terminal to provide shielding for the primary first conductive terminal and reduce any effect of external interference on signal transmission of the primary first conductive terminal.

Preferably, the connector assembly said above, wherein the inner insulation terminal block has an inner insulation terminal block primary gap structure located near the primary first conductive terminal to form at least one gap between the inner insulation terminal block and the primary first conductive terminal and allow an adequate impedance value of signal transmission for the primary first conductive terminal.

Preferably, the connector assembly said above, wherein the at least one primary first conductive terminal includes a plurality of primary first conductive terminals, and the primary second conductive terminal is close to at least one of the plurality of primary first conductive terminals to provide shielding and reduce any effect of external interference on signal transmission of the nearby primary first conductive terminal.

Preferably, the connector assembly said above, wherein the primary first conductive terminal projection area is located within the primary second conductive terminal projection area.

Preferably, the connector assembly said above, further including: an outer insulation terminal block having an outer insulation terminal block head structure and an outer insulation terminal block tail structure, and wherein the primary second conductive terminal further includes a primary second conductive terminal inner embedding structure and a primary second conductive terminal outer embedding structure, wherein the primary second conductive terminal outer embedding structure is for being embedded with the outer insulation terminal block, and the primary second conductive terminal inner embedding structure is for being embedded with the inner insulation terminal block, so as to position the outer insulation terminal block and the inner insulation terminal block in a manner that, the primary first conductive terminal coupling structure and the primary second conductive terminal coupling structure are located at the outer insulation terminal block head structure to be able to couple the coupling portion of the coupling component, and the primary first conductive terminal bonding structure and the primary second conductive terminal bonding structure are located at the outer insulation terminal block tail structure to be able to bond the bonding portion of the bonding component.

Preferably, the connector assembly said above, wherein the outer insulation terminal block further includes an outer insulation terminal block primary first positioning structure and an outer insulation terminal block primary second positioning structure, wherein the outer insulation terminal block primary first positioning structure is for positioning the primary first conductive terminal to fix it at a predetermined position, and the outer insulation terminal block primary second positioning structure is for positioning the primary second conductive terminal to fix it at a predetermined position.

Preferably, the connector assembly said above, wherein the inner insulation terminal block primary first positioning structure is a snap structure for gripping and positioning the primary first conductive terminal, the inner insulation terminal block primary second positioning structure is a slot structure for allowing the primary second conductive terminal to be inserted and positioned, the outer insulation terminal block primary first positioning structure is an abutting structure for abutting and positioning the primary first conductive terminal, and the outer insulation terminal block primary second positioning structure is a slot structure for allowing the primary second conductive terminal to be inserted and positioned.

Preferably, the connector assembly said above, wherein the inner insulation terminal block further includes an inner insulation terminal block primary fastening structure, and the outer insulation terminal block further includes an outer insulation terminal block primary fastening structure, wherein the inner insulation terminal block primary fastening structure is for being hooked to the outer insulation terminal block primary fastening structure, so as to keep the inner insulation terminal block in the outer insulation terminal block.

Preferably, the connector assembly said above, further including: a primary jumper conductor, and wherein the at least one primary second conductive terminal includes a plurality of primary second conductive terminals, each of the primary second conductive terminals having a primary second conductive terminal abutting structure, wherein the primary jumper conductor is embedded in the inner insulation terminal block in a manner that the primary jumper conductor goes over the primary first conductive terminal, and the primary second conductive terminal abutting structure goes through the inner insulation terminal block to abut the primary jumper conductor, so as to allow the primary jumper conductor to bridge and link the plurality of primary second conductive terminals, making them electrically interconnected to form a primary second conductive circuit.

Preferably, the connector assembly said above, wherein the primary jumper conductor includes a primary jumper conductor insertion structure for being inserted to the inner insulation terminal block so as to allow the primary jumper conductor to be embedded in the inner insulation terminal block.

Preferably, the connector assembly said above, wherein the primary jumper conductor can be a plastic conductor or metallic conductor.

Preferably, the connector assembly said above, further including: a secondary terminal set, with a secondary terminal set projection plane being defined, the secondary terminal set including at least one secondary first conductive terminal and at least one secondary second conductive terminal, wherein the secondary first conductive terminal has a secondary first conductive terminal coupling structure and a secondary first conductive terminal bonding structure, and the secondary second conductive terminal has a secondary second conductive terminal coupling structure and a secondary second conductive terminal bonding structure; and the inner insulation terminal block further including an inner insulation terminal block secondary first positioning structure and an inner insulation terminal block secondary second positioning structure, wherein, the inner insulation terminal block secondary first positioning structure is for positioning the secondary first conductive terminal in a manner that the secondary first conductive terminal is held at a predetermined position and extended in a direction parallel to the secondary terminal set projection plane, so as to allow the secondary first conductive terminal coupling structure to be coupled to the coupling portion of the coupling component, and allow the secondary first conductive terminal bonding structure to be bonded to the bonding portion of the bonding component; the inner insulation terminal block secondary second positioning structure is for positioning the secondary second conductive terminal in a manner that the secondary second conductive terminal is held at a predetermined position and extended in a direction parallel to the secondary terminal set projection plane, so as to allow the secondary second conductive terminal coupling structure to be coupled to the coupling portion of the coupling component, and allow the secondary second conductive terminal bonding structure to be bonded to the bonding portion of the bonding component; and the secondary first conductive terminal has a secondary first conductive terminal projection area on the secondary terminal set projection plane, and the secondary second conductive terminal has a secondary second conductive terminal projection area on the secondary terminal set projection plane, wherein the secondary second conductive terminal projection area is larger than the secondary first conductive terminal projection area, allowing the secondary second conductive terminal to provide shielding for the secondary first conductive terminal, so as to reduce any effect of external interference on signal transmission of the secondary first conductive terminal.

Preferably, the connector assembly said above, wherein the inner insulation terminal block has an inner insulation terminal block secondary gap structure, which is located near the secondary first conductive terminal to form at least one gap between the inner insulation terminal block and the secondary first conductive terminal to allow an adequate impedance value of signal transmission for the secondary first conductive terminal.

Preferably, the connector assembly said above, wherein the at least one secondary first conductive terminal includes a plurality of secondary first conductive terminals, and the at least one secondary second conductive terminal is close to at least one of the plurality of secondary first conductive terminals to provide shielding and reduce any effect of external interference on signal transmission of the nearby secondary first conductive terminal.

Preferably, the connector assembly said above, wherein the secondary first conductive terminal projection area is located within the secondary second conductive terminal projection area.

Preferably, the connector assembly said above, further including: an outer insulation terminal block having an outer insulation terminal block head structure and an outer insulation terminal block tail structure, and wherein the secondary second conductive terminal further includes a secondary second conductive terminal inner embedding structure and a secondary second conductive terminal outer embedding structure, wherein the secondary second conductive terminal outer embedding structure is for being embedded with the outer insulation terminal block, and the secondary second conductive terminal inner embedding structure is for being embedded with the inner insulation terminal block, so as to position the outer insulation terminal block and the inner insulation terminal block in a manner that, the secondary first conductive terminal coupling structure and the secondary second conductive terminal coupling structure are located at the outer insulation terminal block head structure to be able to couple the coupling portion of the coupling component, and the secondary first conductive terminal bonding structure and the secondary second conductive terminal bonding structure are located at the outer insulation terminal block tail structure to be able to bond the bonding portion of the bonding component.

Preferably, the connector assembly said above, wherein the outer insulation terminal block further includes an outer insulation terminal block secondary first positioning structure and an outer insulation terminal block secondary second positioning structure, wherein the outer insulation terminal block secondary first positioning structure is for positioning the secondary first conductive terminal to fix it at a predetermined position, and the outer insulation terminal block secondary second positioning structure is for positioning the secondary second conductive terminal to fix it at a predetermined position.

Preferably, the connector assembly said above, wherein the inner insulation terminal block secondary first positioning structure is a snap structure for gripping and positioning the secondary first conductive terminal, the inner insulation terminal block secondary second positioning structure is a slot structure for allowing the secondary second conductive terminal to be inserted and positioned, the outer insulation terminal block secondary first positioning structure is an abutting structure for abutting and positioning the secondary first conductive terminal, and the outer insulation terminal block secondary second positioning structure is a slot structure for allowing the secondary second conductive terminal to be inserted and positioned.

Preferably, the connector assembly said above, wherein the inner insulation terminal block further includes an inner insulation terminal block secondary fastening structure, and the outer insulation terminal block further includes an outer insulation terminal block secondary fastening structure, wherein the inner insulation terminal block secondary fastening structure is for being hooked to the outer insulation terminal block secondary fastening structure, so as to keep the inner insulation terminal block in the outer insulation terminal block.

Preferably, the connector assembly said above, further including: a secondary jumper conductor, and wherein the at least one secondary second conductive terminal includes a plurality of secondary second conductive terminals, each of the secondary second conductive terminals having a secondary second conductive terminal abutting structure, wherein the secondary jumper conductor is embedded in the inner insulation terminal block in a manner that the secondary jumper conductor goes over the secondary first conductive terminal, and the secondary second conductive terminal abutting structure goes through the inner insulation terminal block to abut the secondary jumper conductor, so as to allow the secondary jumper conductor to bridge and link the plurality of secondary second conductive terminals, making them electrically interconnected to form a secondary second conductive circuit.

Preferably, the connector assembly said above, wherein the secondary jumper conductor includes a secondary jumper conductor insertion structure for being inserted to the inner insulation terminal block so as to allow the secondary jumper conductor to be embedded in the inner insulation terminal block.

Preferably, the connector assembly said above, wherein the secondary jumper conductor can be a plastic conductor or metallic conductor.

Preferably, the connector assembly said above, wherein the primary jumper conductor and the secondary jumper conductor are integrally formed to make the primary second conductive circuit electrically connected to the secondary second conductive circuit.

Preferably, the connector assembly said above, wherein the primary second conductive terminal and the secondary second conductive terminal are integrally formed to make the primary second conductive circuit electrically connected to the secondary second conductive circuit.

Compared to the conventional technology, the present invention proposes a connector assembly allowing a conductive terminal to provide shielding to reduce any effect of external interference on signal transmission of the connector assembly so as to meet signal transmission requirements for the connector assembly, and with the use of a jumper conductor, at least partial conductive terminals on the connector assembly can be electrically interconnected with no need of any additional jumper, such that an electronic device using such connector assembly can be made compact in size desirably.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
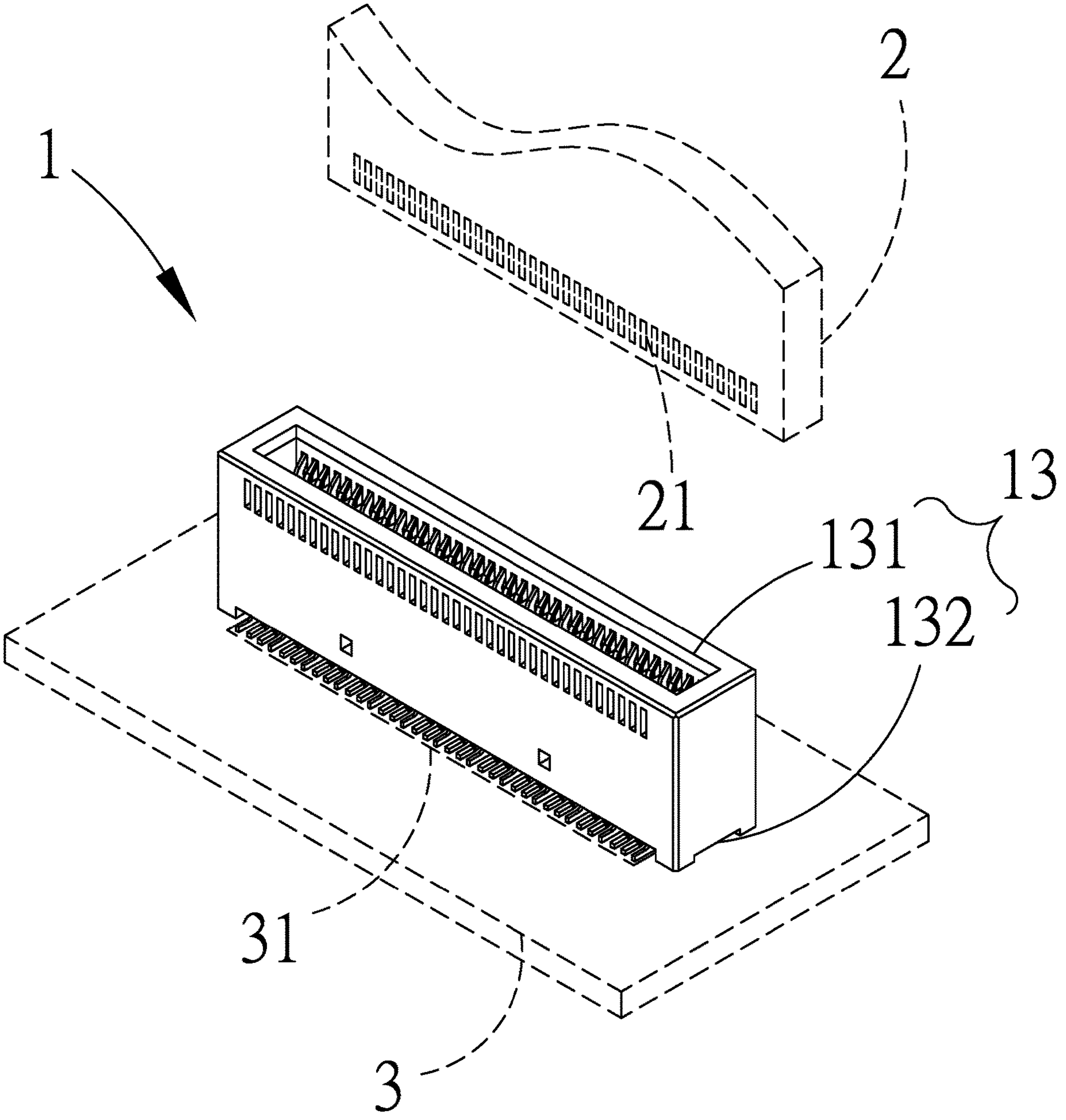
FIG. 1 is a three-dimensional schematic diagram showing preferred embodiment of a connector assembly according to the present invention.
Figure 2:
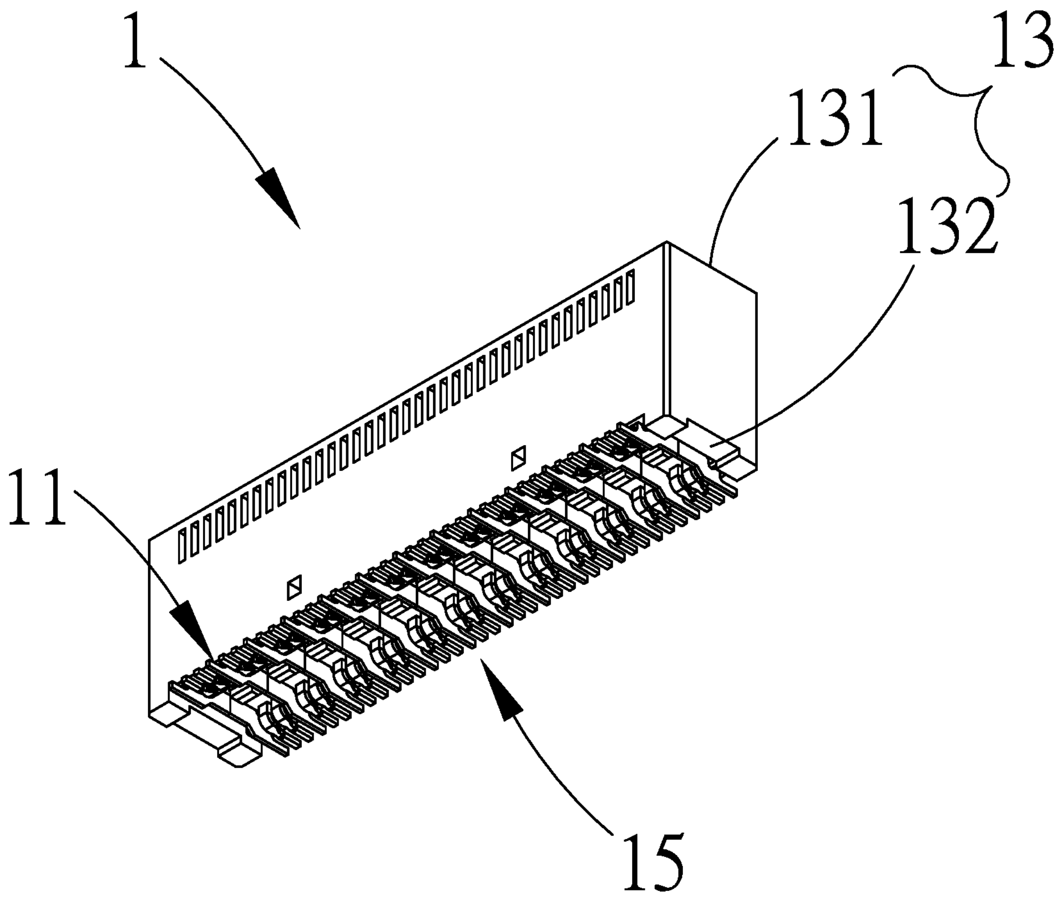
FIG. 2 is a three-dimensional schematic diagram showing preferred embodiment of a connector assembly according to the present invention.
Figure 3:
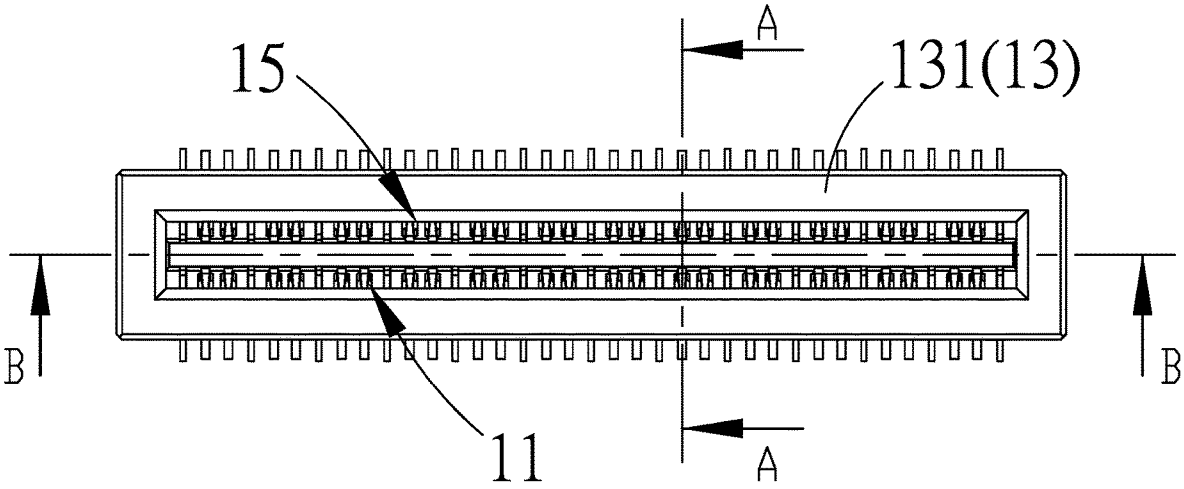
FIG. 3 is a top view schematic diagram showing preferred embodiment of a connector assembly according to the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

The present invention provides a connector assembly, and technical features of this connector assembly are described with reference to FIGS. 1 to 23 and the following embodiments.

As shown in FIG. 1, the connector assembly 1 is used for being coupled to a coupling component 2 and bonded to a bonding component 3. The coupling component 2 has a coupling portion 21 and can be a connector assembly or a circuit substrate. The bonding component 3 has a bonding portion 31 and can be a circuit substrate.

Figure 13:
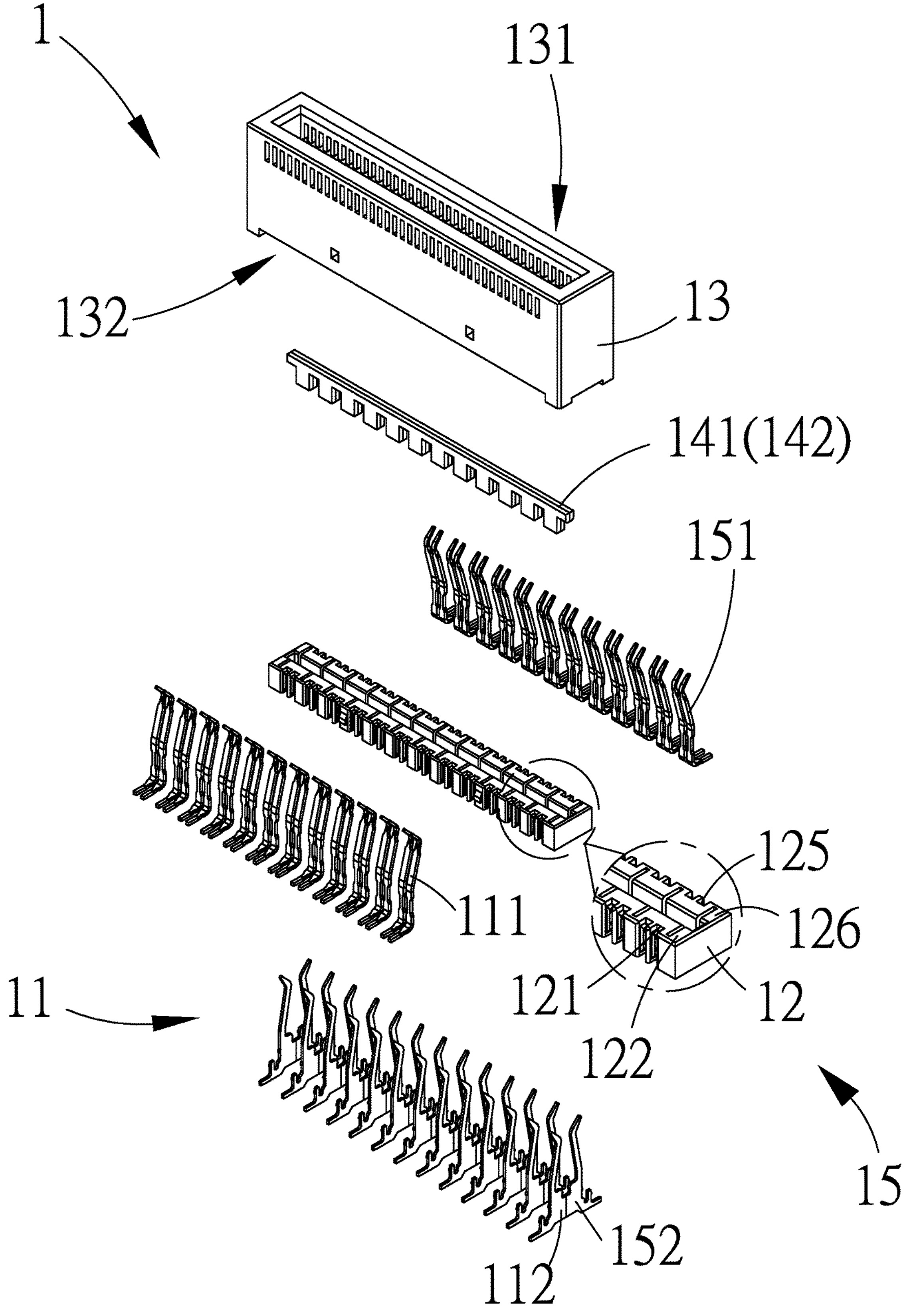
FIG. 13 is an exploded view schematic diagram showing preferred embodiment of a connector assembly according to the present invention.
Figure 14:
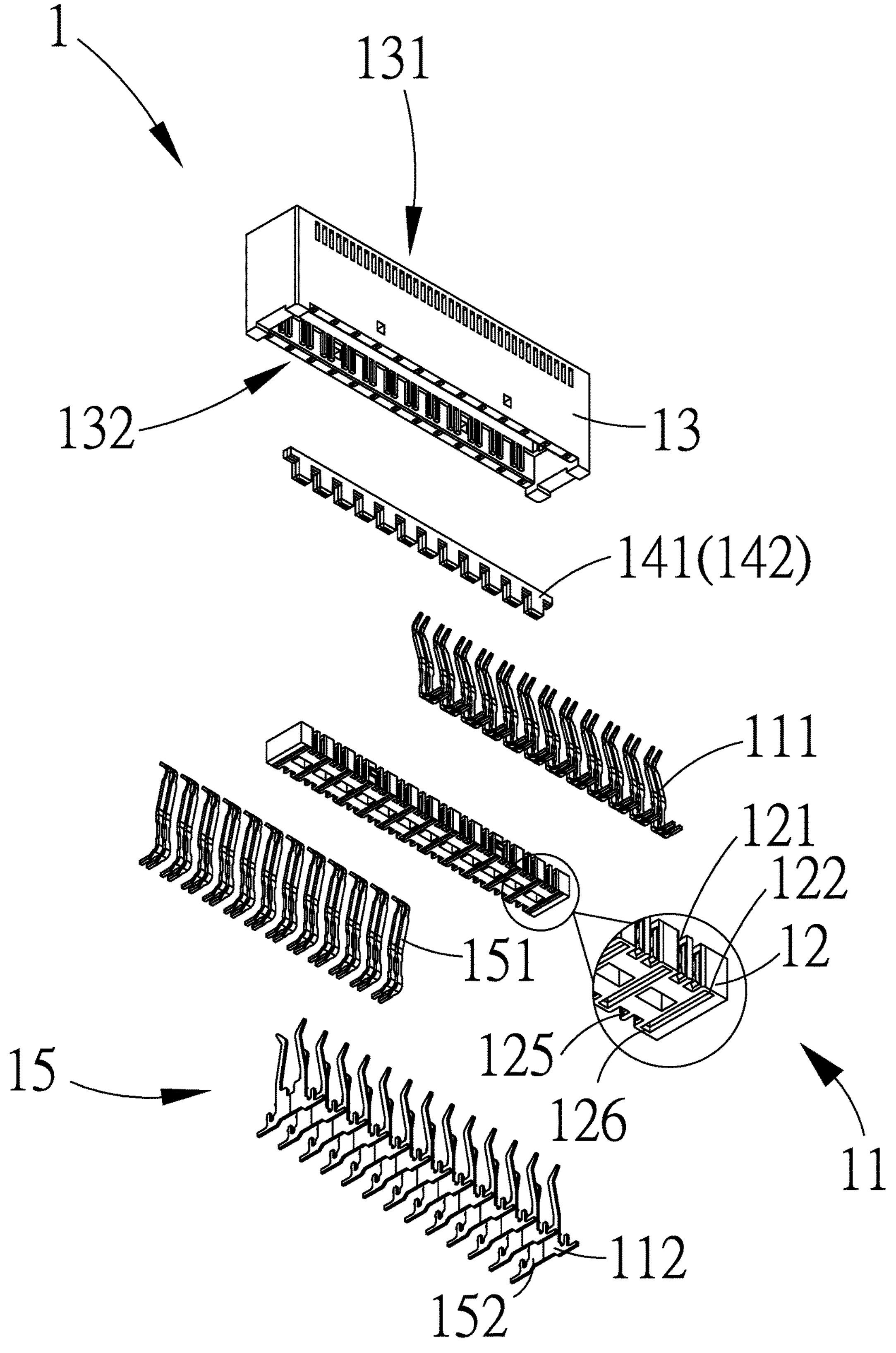
FIG. 14 is an exploded view schematic diagram showing preferred embodiment of a connector assembly according to the present invention.

As shown in FIGS. 13 to 14, the connector assembly 1 includes a primary terminal set 11, an inner insulation terminal block 12, an outer insulation terminal block 13, a primary jumper conductor 141, a secondary jumper conductor 142, and a secondary terminal set 15. The primary terminal set 11 and the secondary terminal set 15 can be made of metallic conductors for transmitting conductive signals or grounding signals.

Figure 4:
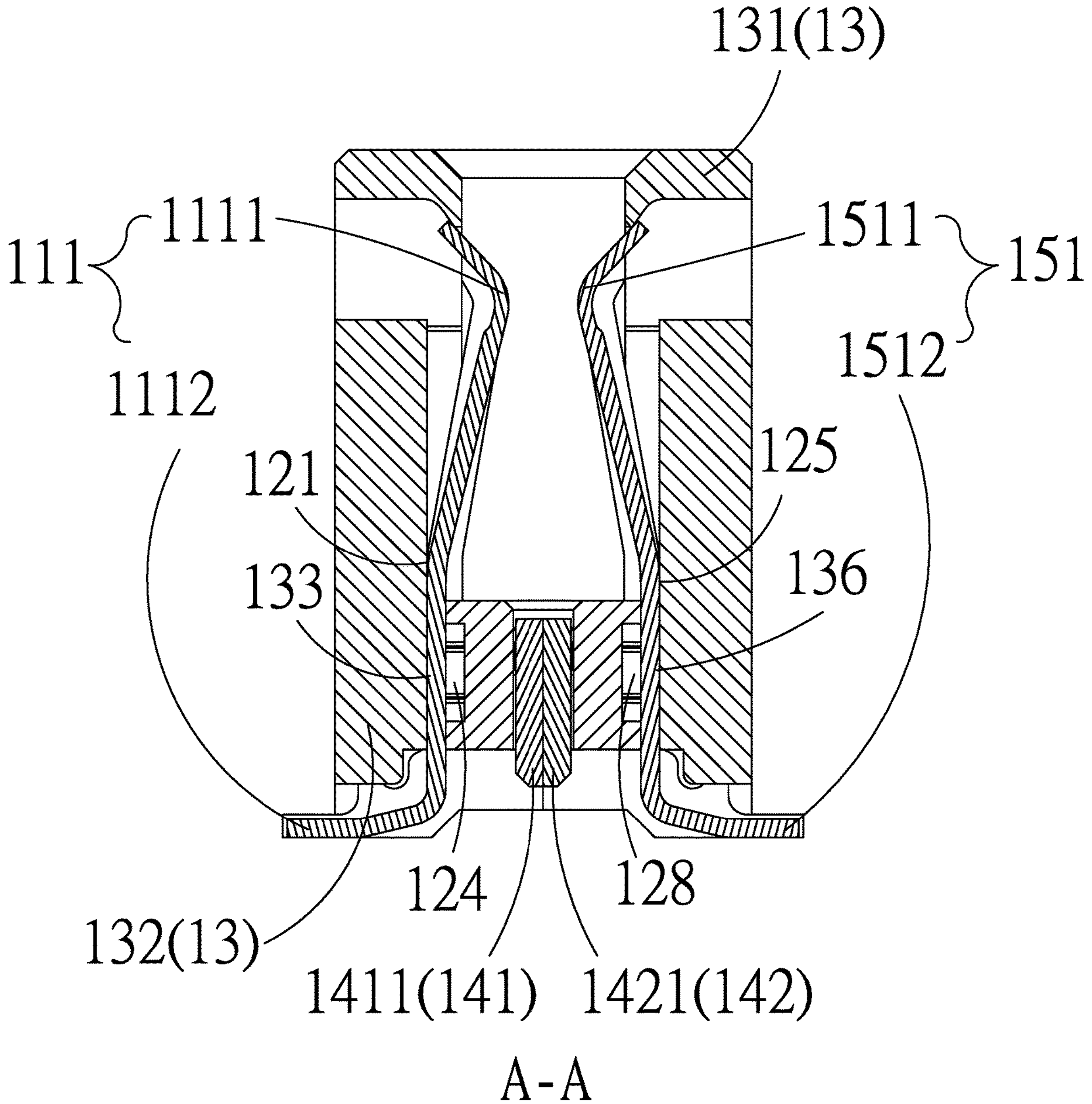
FIG. 4 is a cross-sectional schematic diagram showing the connector assembly in FIG. 3 cut along line AA.
Figure 7:
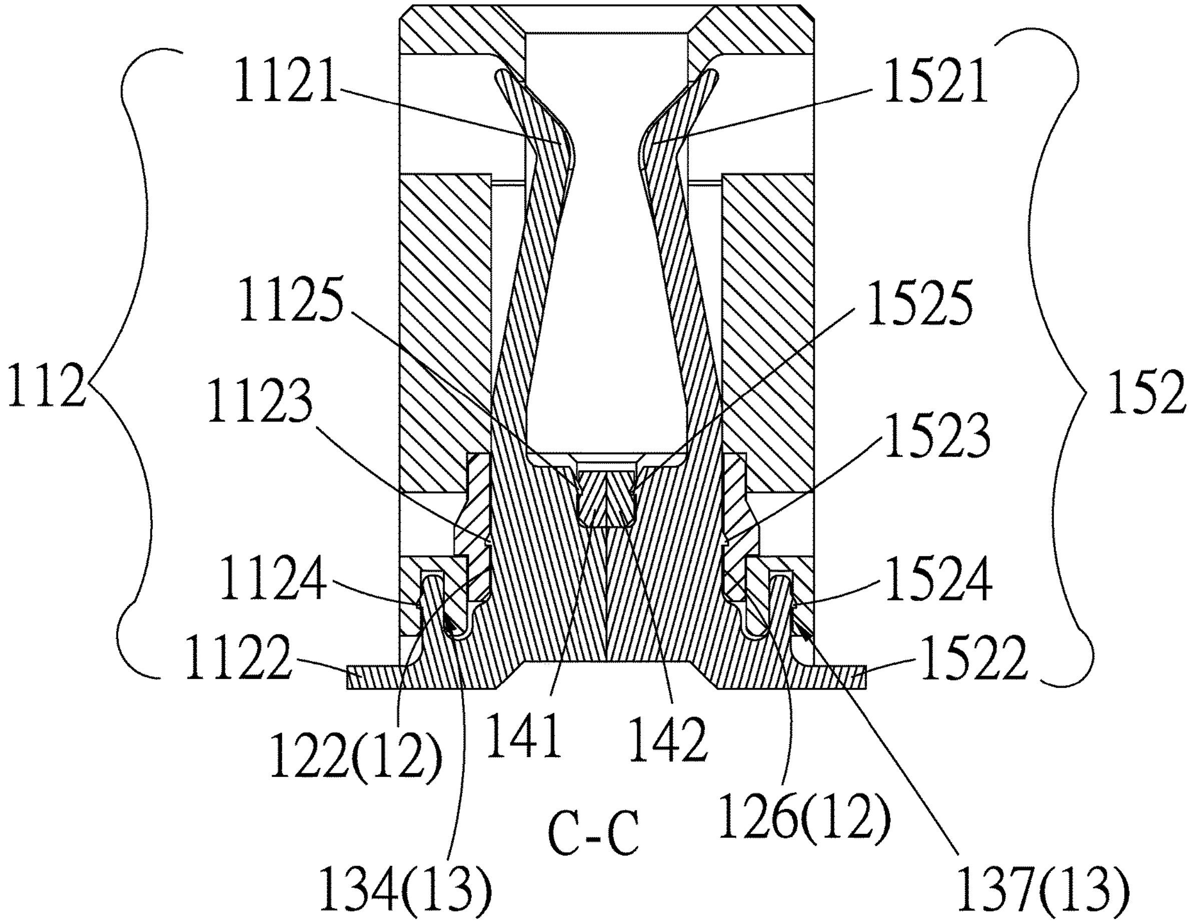
FIG. 7 is a cross-sectional schematic diagram showing the connector assembly in FIG. 6 cut along line CC.
Figure 21:
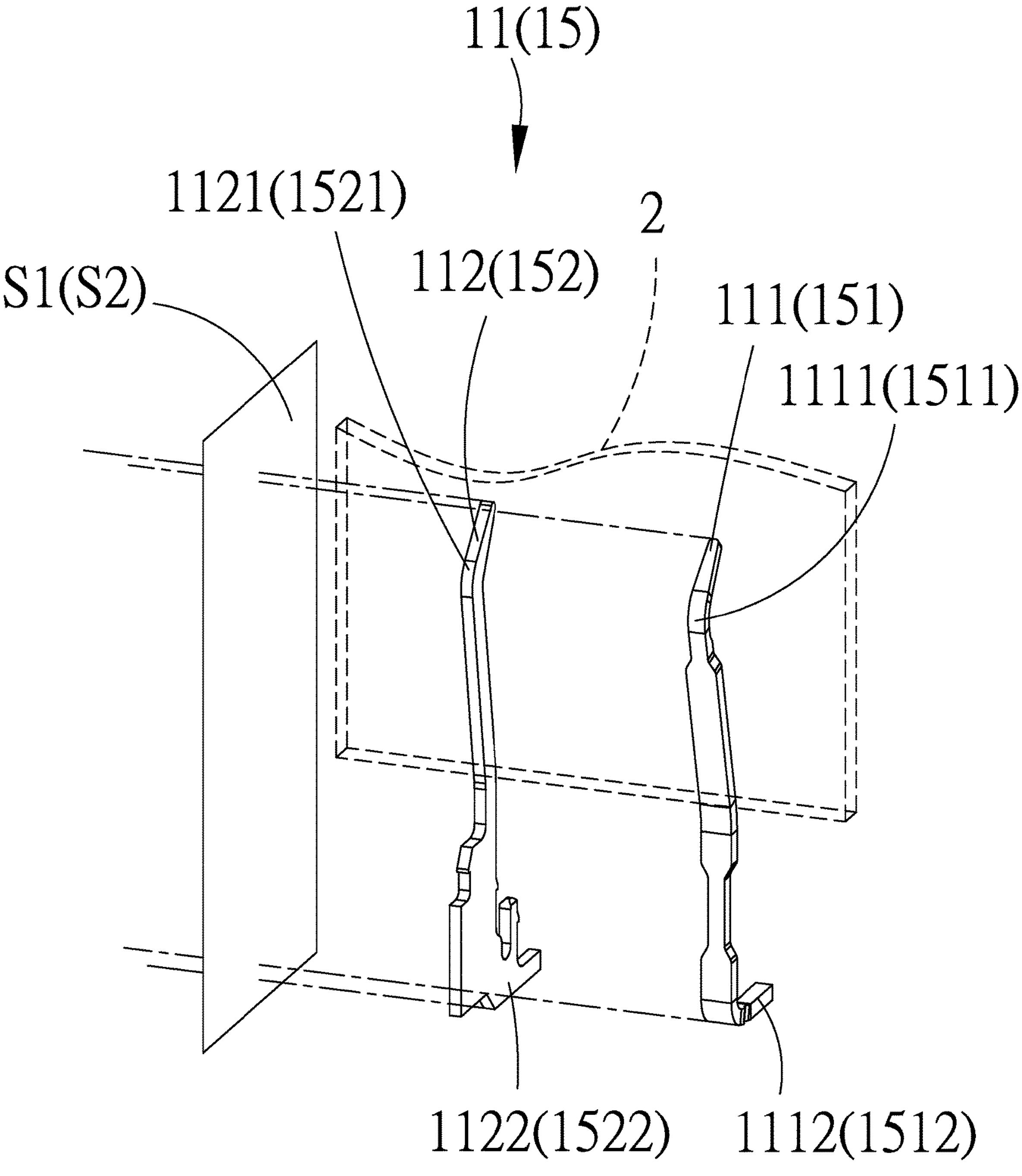
FIG. 21 is a projection view schematic diagram showing preferred embodiment of conductive terminals of a connector assembly according to the present invention.
Figure 22:
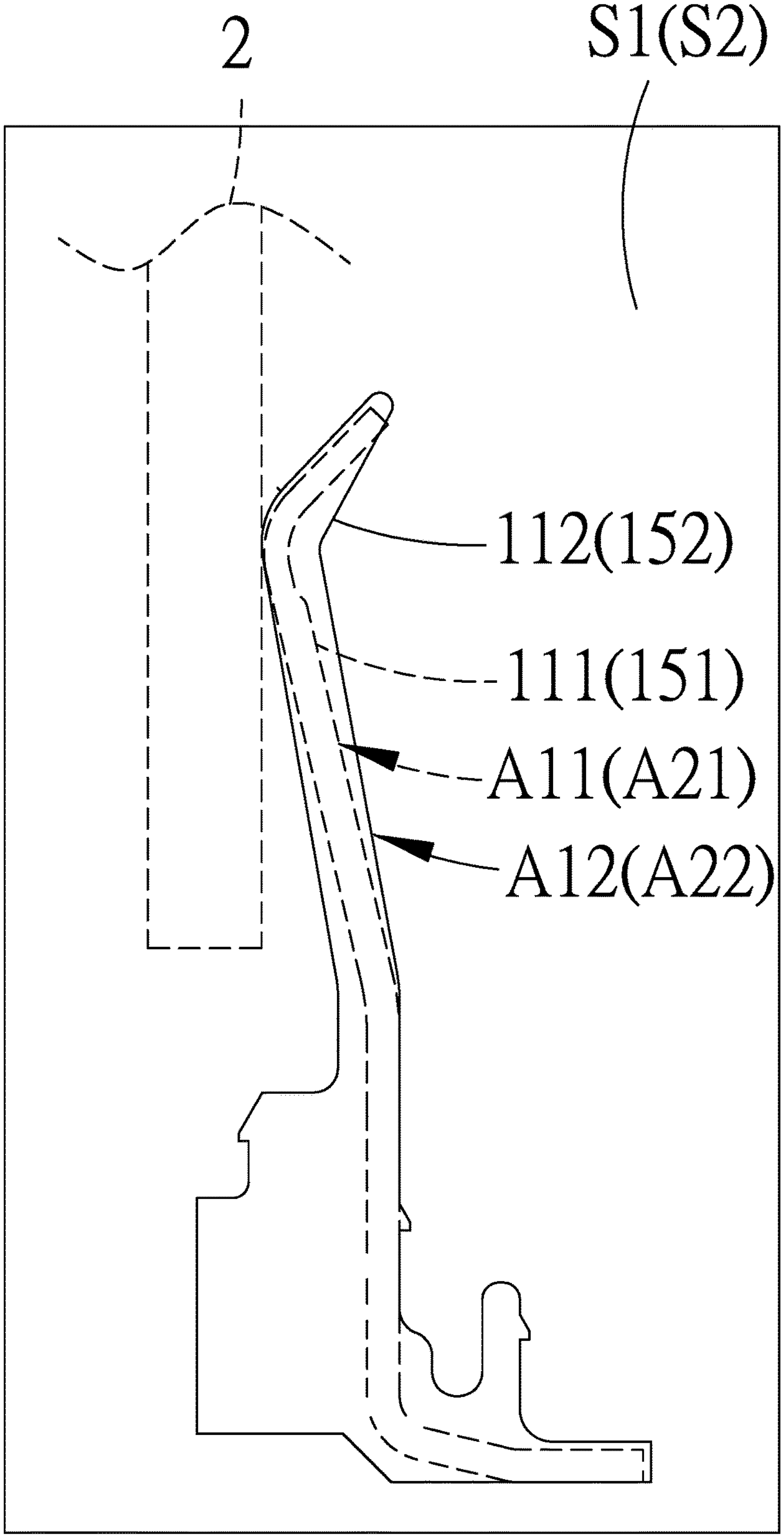
FIG. 22 is a projection view schematic diagram showing preferred embodiment of conductive terminals of a connector assembly according to the present invention.

As shown in FIGS. 21 to 22, there is defined a primary terminal set projection plane S1 for the primary terminal set 11. The primary terminal set 11 includes at least one primary first conductive terminal 111 and at least one primary second conductive terminal 112. As shown in FIG. 4, the primary first conductive terminal 111 has a primary first conductive terminal coupling structure 1111 and a primary first conductive terminal bonding structure 1112. As shown in FIG. 7, the primary second conductive terminal 112 has a primary second conductive terminal coupling structure 1121 and a primary second conductive terminal bonding structure 1122.

Moreover, as shown in FIGS. 21 to 22, there is defined a secondary terminal set projection plane S2 for the secondary terminal set 15. The secondary terminal set 15 includes at least one secondary first conductive terminal 151 and at least one secondary second conductive terminal 152. As shown in FIG. 4, the secondary first conductive terminal 151 has a secondary first conductive terminal coupling structure 1511 and a secondary first conductive terminal bonding structure 1512. As shown in FIG. 7, the secondary second conductive terminal 152 has a secondary second conductive terminal coupling structure 1521 and a secondary second conductive terminal bonding structure 1522.

As shown in FIGS. 13 to 18, the inner insulation terminal block 12 includes an inner insulation terminal block primary first positioning structure 121, an inner insulation terminal block primary second positioning structure 122, an inner insulation terminal block secondary first positioning structure 125 and an inner insulation terminal block secondary second positioning structure 126.

The inner insulation terminal block primary first positioning structure 121 can be a snap structure for gripping and positioning the primary first conductive terminal 111 to allow the primary first conductive terminal 111 to be situated at a predetermined position and extended in a direction parallel to the primary terminal set projection plane S1 (as shown in FIG. 21), such that the primary first conductive terminal coupling structure 1111 can provide signal transmission for the coupling portion 21 of the coupling component 2, and the primary first conductive terminal bonding structure 1112 can provide signal transmission for the bonding portion 31 of the bonding component 3.

The inner insulation terminal block secondary first positioning structure 125 can be a snap structure for gripping and positioning the secondary first conductive terminal 151 to allow the secondary first conductive terminal 151 to be situated at a predetermined position and extended in a direction parallel to the secondary terminal set projection plane S2 (as shown in FIG. 21), such that the secondary first conductive terminal coupling structure 1511 can provide signal transmission for the coupling portion 21 of the coupling component 2, and the secondary first conductive terminal bonding structure 1512 can provide signal transmission for the bonding portion 31 of the bonding component 3.

The inner insulation terminal block primary second positioning structure 122 can be a slot structure for allowing the primary second conductive terminal 112 to be inserted and positioned in a manner that the primary second conductive terminal 112 is held at a predetermined position and extended in a direction parallel to the primary terminal set projection plane S1 (as shown in FIG. 21), such that the primary second conductive terminal coupling structure 1121 can provide signal transmission for the coupling portion 21 of the coupling component 2, and the primary second conductive terminal bonding structure 1122 can provide signal transmission for the bonding portion 31 of the bonding component 3.

The inner insulation terminal block secondary second positioning structure 126 can be a slot structure for allowing the secondary second conductive terminal 152 to be inserted and positioned in a manner that the secondary second conductive terminal 152 is held at a predetermined position and extended in a direction parallel to the secondary terminal set projection plane S2 (as shown in FIG. 21), such that the secondary second conductive terminal coupling structure 1521 can provide signal transmission for the coupling portion 21 of the coupling component 2, and the secondary second conductive terminal bonding structure 1522 can provide signal transmission for the bonding portion 31 of the bonding component 3.

Figure 5:
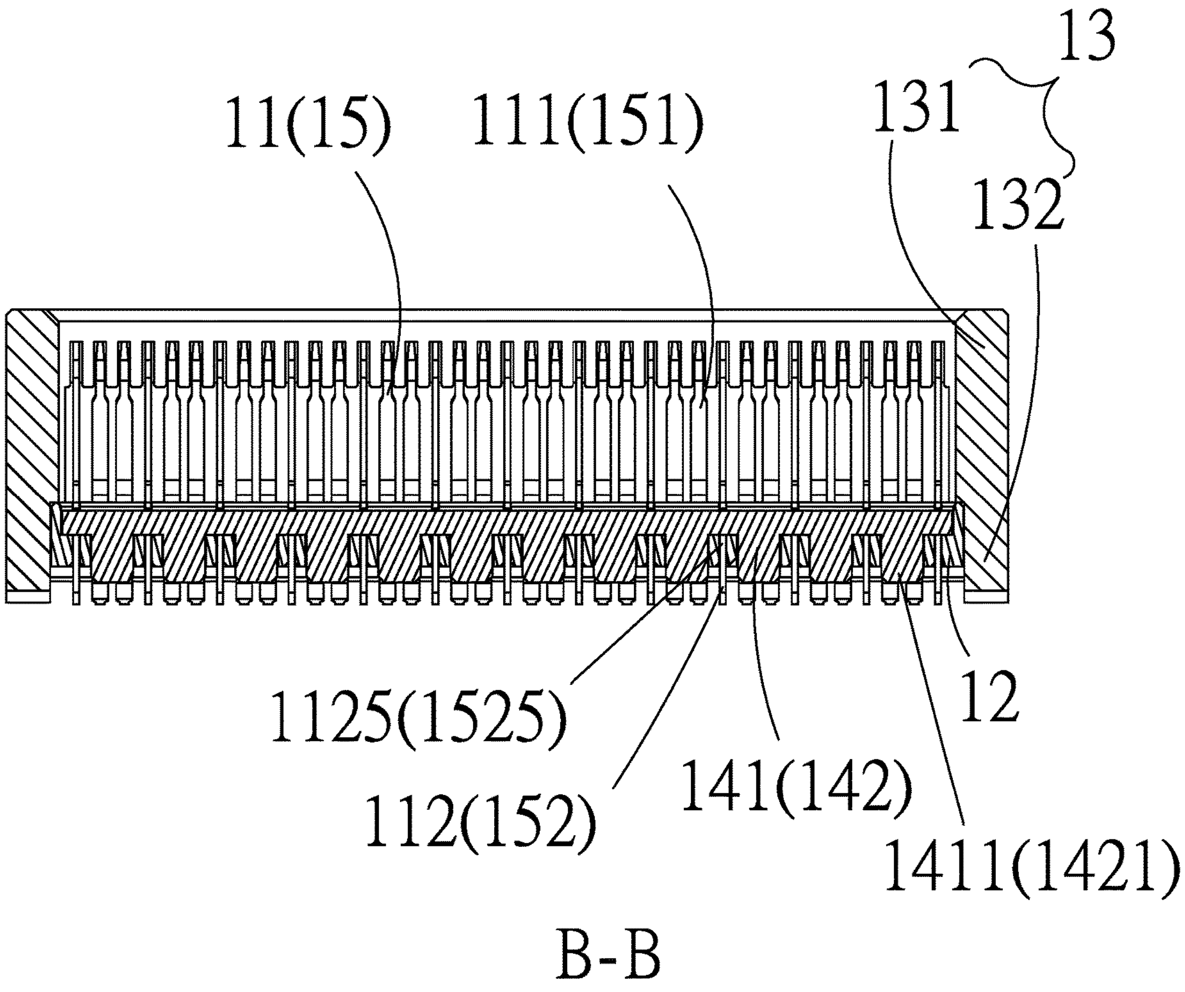
FIG. 5 is a cross-sectional schematic diagram showing the connector assembly in FIG. 3 cut along line BB.
Figure 6:
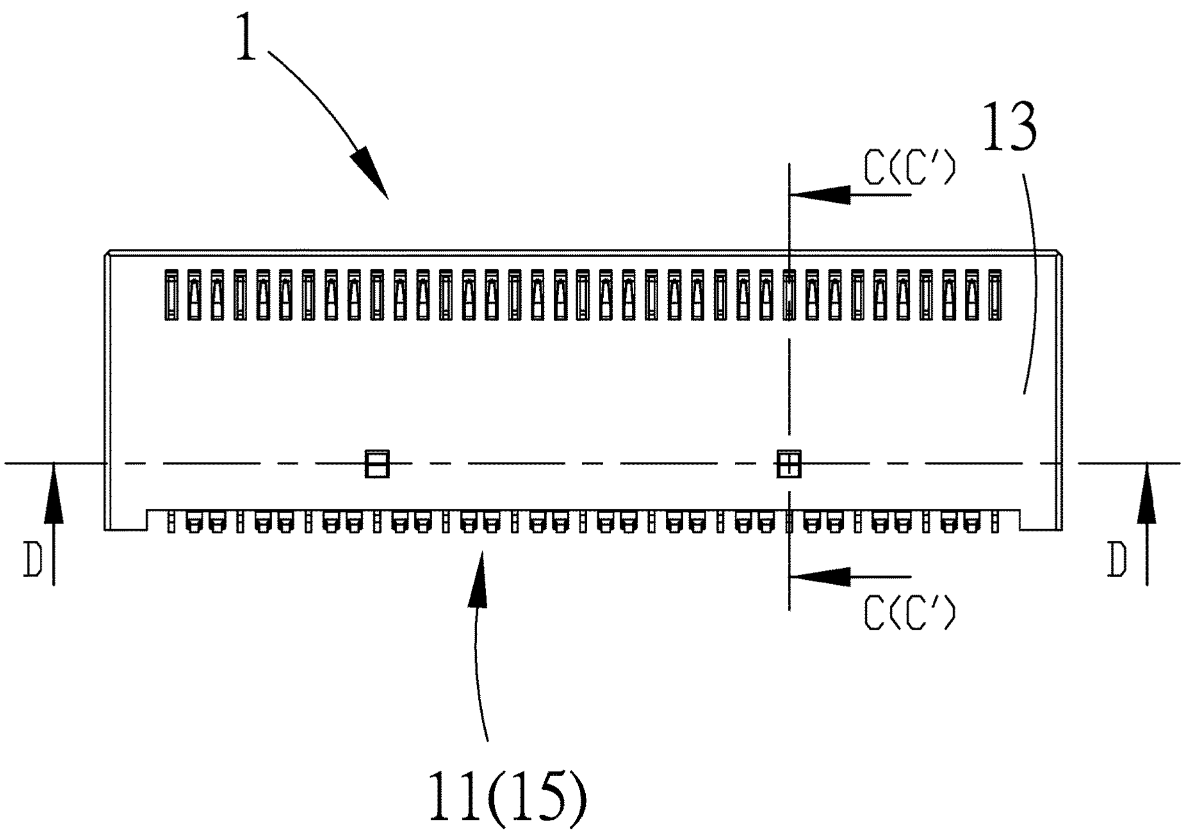
FIG. 6 is a side view schematic diagram showing preferred embodiment of a connector assembly according to the present invention.

As shown in FIG. 5, the primary terminal set 11 includes a plurality of primary first conductive terminals 111, and the primary second conductive terminal 112 is close to at least one of the plurality of primary first conductive terminals 111 to transmit grounding signals for providing shielding for the nearby at least one primary first conductive terminal 111 to reduce any effect of external interference (such as EMI or noise interference) on signal transmission of the nearby primary first conductive terminal 111, so as to fulfill signal transmission requirements for the connector assembly.

As shown in FIG. 22, the primary first conductive terminal 111 has a primary first conductive terminal projection area A11 on the primary terminal set projection plane S1, and the primary second conductive terminal 112 has a primary second conductive terminal projection area A12 on the primary terminal set projection plane S1, wherein the primary second conductive terminal projection area A12 is larger than the primary first conductive terminal projection area A11, and thus the primary second conductive terminal 112 can act as a shield for the primary first conductive terminal 111 to reduce any effect of external interference on signal transmission of the primary first conductive terminal 111 so as to meet signal transmission requirements for the connector assembly. Preferably, the primary first conductive terminal projection area A11 is located within the primary second conductive terminal projection area A12 to ideally reduce any effect of external interference on signal transmission of the primary first conductive terminal 111 so as to meet signal transmission requirements for the connector assembly.

Moreover, as shown in FIG. 5, the secondary terminal set 15 includes a plurality of secondary first conductive terminals 151, and the secondary second conductive terminal 152 is close to at least one of the plurality of secondary first conductive terminals 151 to transmit grounding signals for providing shielding for the nearby at least one secondary first conductive terminal 151 to reduce any effect of external interference (such as EMI or noise interference) on signal transmission of the nearby secondary first conductive terminal 151, so as to fulfill signal transmission requirements for the connector assembly.

As shown in FIG. 22, the secondary first conductive terminal 151 has a secondary first conductive terminal projection area A21 on the secondary terminal set projection plane S2, and the secondary second conductive terminal 152 has a secondary second conductive terminal projection area A22 on the secondary terminal set projection plane S2, wherein the secondary second conductive terminal projection area A22 is larger than the secondary first conductive terminal projection area A21, and thus the secondary second conductive terminal 152 can act as a shield for the secondary first conductive terminal 151 to reduce any effect of external interference on signal transmission of the secondary first conductive terminal 151 so as to meet signal transmission requirements for the connector assembly. Preferably, the secondary first conductive terminal projection area A21 is located within the secondary second conductive terminal projection area A22 to ideally reduce any effect of external interference on signal transmission of the secondary first conductive terminal 151 so as to meet signal transmission requirements for the connector assembly.

Figure 8:
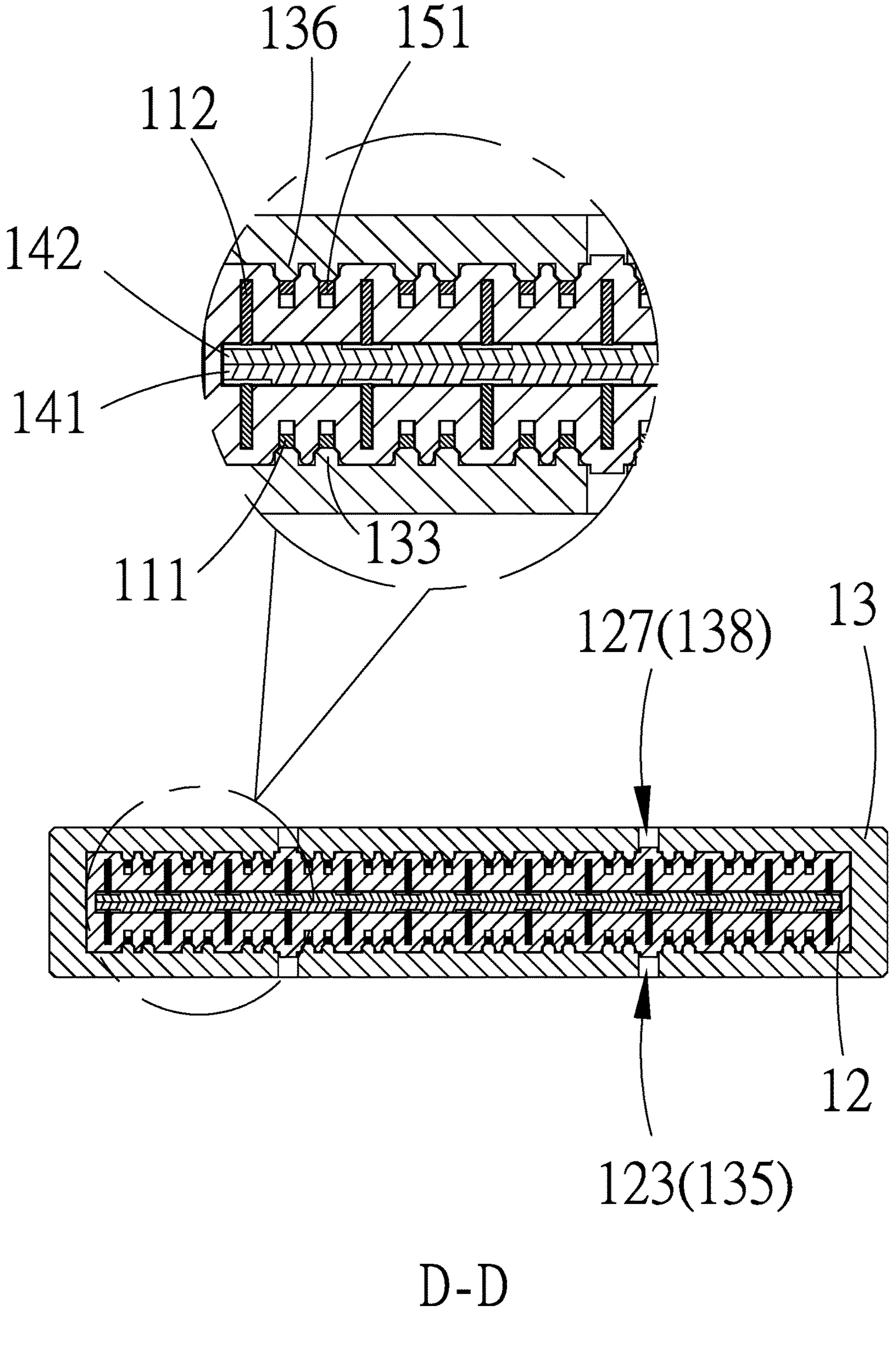
FIG. 8 is a cross-sectional schematic diagram showing the connector assembly in FIG. 6 cut along line DD.
Figure 9:
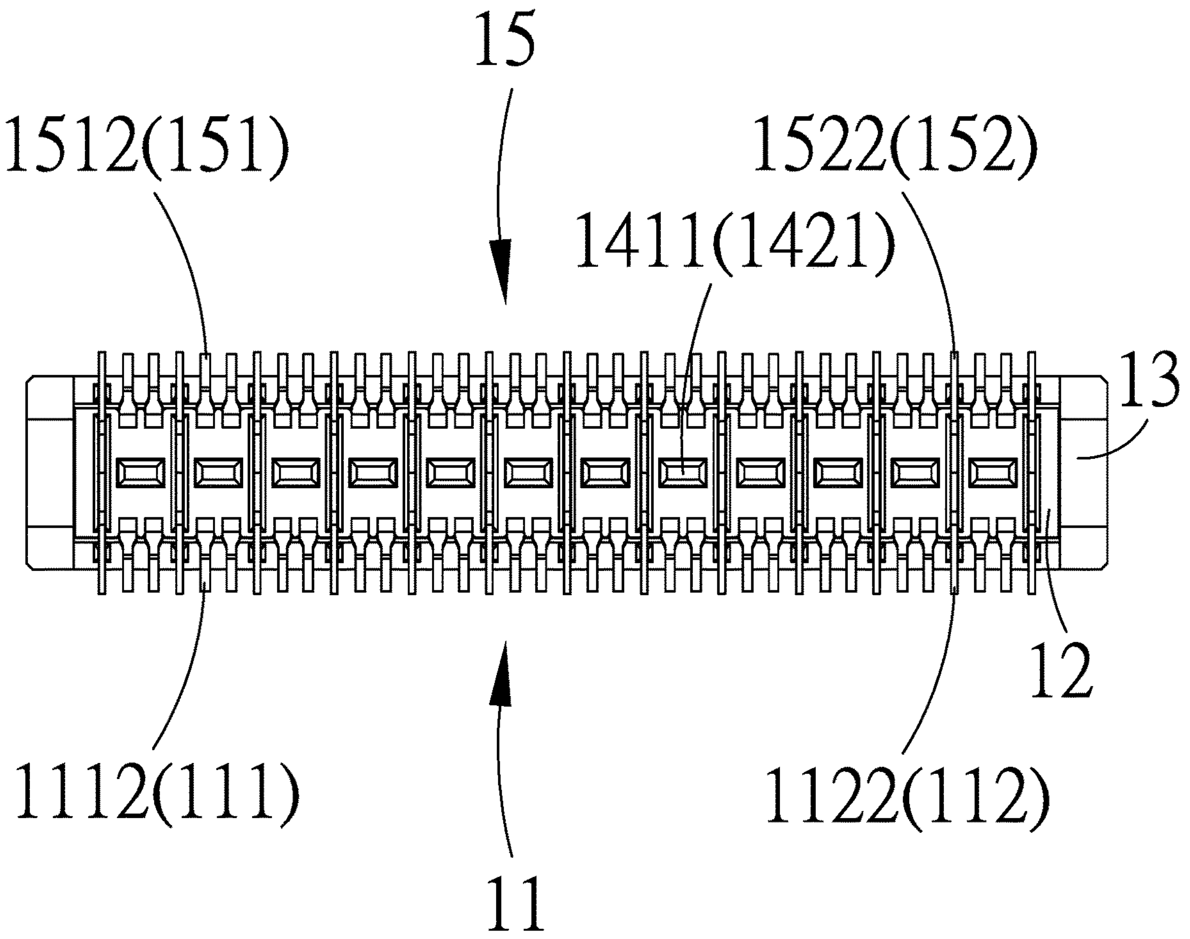
FIG. 9 is a bottom view schematic diagram showing preferred embodiment of a connector assembly according to the present invention.
Figure 10:
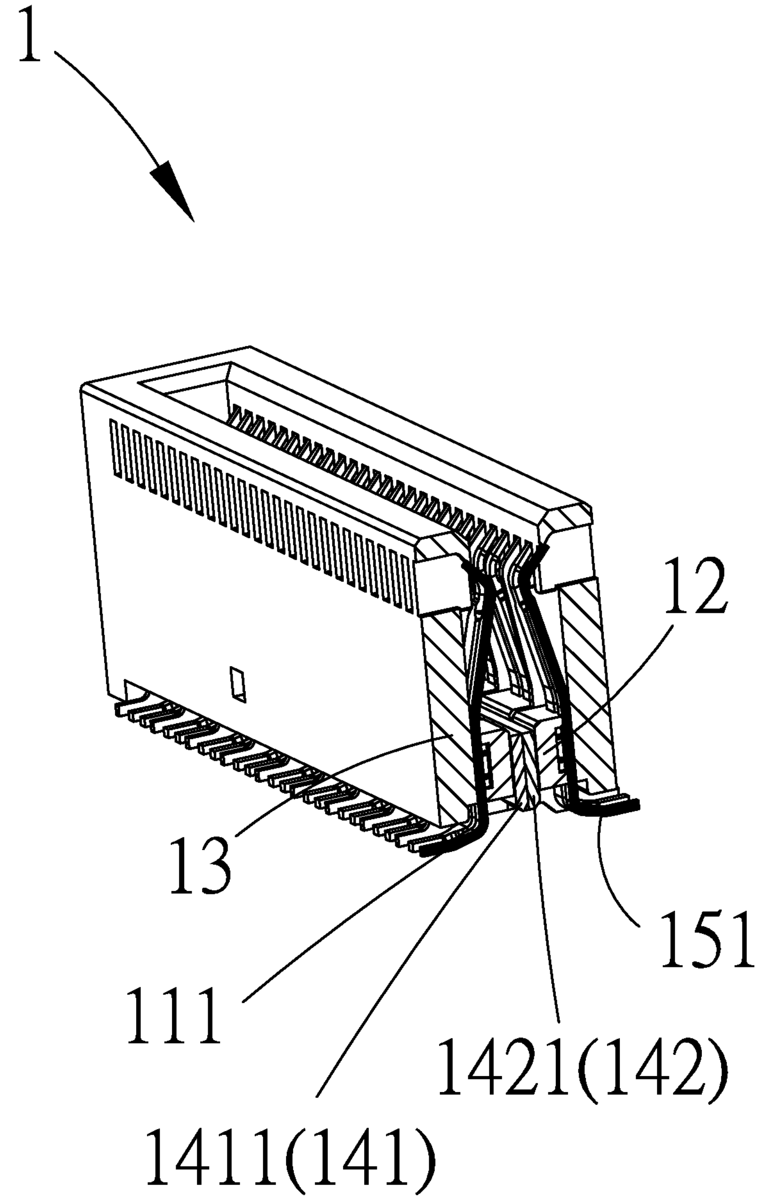
FIG. 10 is a cross-sectional view schematic diagram showing preferred embodiment of a connector assembly according to the present invention.

As shown in FIGS. 4, 7 and 8, the outer insulation terminal block 13 includes an outer insulation terminal block head structure 131, an outer insulation terminal block tail structure 132, an outer insulation terminal block primary first positioning structure 133, an outer insulation terminal block primary second positioning structure 134, an outer insulation terminal block secondary first positioning structure 136 and an outer insulation terminal block secondary second positioning structure 137. The outer insulation terminal block primary first positioning structure 133 can be an abutting structure for abutting and positioning the primary first conductive terminal 111 to fix it at a predetermined position. The outer insulation terminal block primary second positioning structure 134 can be slot structure for allowing the primary second conductive terminal 112 to be inserted and positioned to fix it at a predetermined position. The outer insulation terminal block secondary first positioning structure 136 can be an abutting structure for abutting and positioning the secondary first conductive terminal 151 to fix it at a predetermined position. The outer insulation terminal block secondary second positioning structure 137 can be a slot structure for allowing the secondary second conductive terminal 152 to be inserted and positioned to fix it at a predetermined position.

As shown in FIG. 7, the primary second conductive terminal 112 includes a primary second conductive terminal inner embedding structure 1123 and a primary second conductive terminal outer embedding structure 1124. The primary second conductive terminal outer embedding structure 1124 is used to be embedded with the outer insulation terminal block 13. The primary second conductive terminal inner embedding structure 1123 is used to be embedded with the inner insulation terminal block 12. Thus, the primary second conductive terminal 112 can be used to position the outer insulation terminal block 13 and the inner insulation terminal block 12 in a manner that, the primary first conductive terminal coupling structure 1111 and the primary second conductive terminal coupling structure 1121 are located at the outer insulation terminal block head structure 131 to be able to couple the coupling portion 21 of the coupling component 2, and the primary first conductive terminal bonding structure 1112 and the primary second conductive terminal bonding structure 1122 are located at the outer insulation terminal block tail structure 132 to be able to bond the bonding portion 31 of the bonding component 3.

Moreover, the secondary second conductive terminal 152 includes a secondary second conductive terminal inner embedding structure 1523 and a secondary second conductive terminal outer embedding structure 1524. The secondary second conductive terminal outer embedding structure 1524 is used to be embedded with the outer insulation terminal block 13. The secondary second conductive terminal inner embedding structure 1523 is used to be embedded with the inner insulation terminal block 12. Thus, the secondary second conductive terminal 152 can be used to position the outer insulation terminal block 13 and the inner insulation terminal block 12 in a manner that, the secondary first conductive terminal coupling structure 1511 and the secondary second conductive terminal coupling structure 1521 are located at the outer insulation terminal block head structure 131 to be able to couple the coupling portion 21 of the coupling component 2, and the secondary first conductive terminal bonding structure 1512 and the secondary second conductive terminal bonding structure 1522 are located at the outer insulation terminal block tail structure 132 to be able to bond the bonding portion 31 of the bonding component 3.

Figure 11:
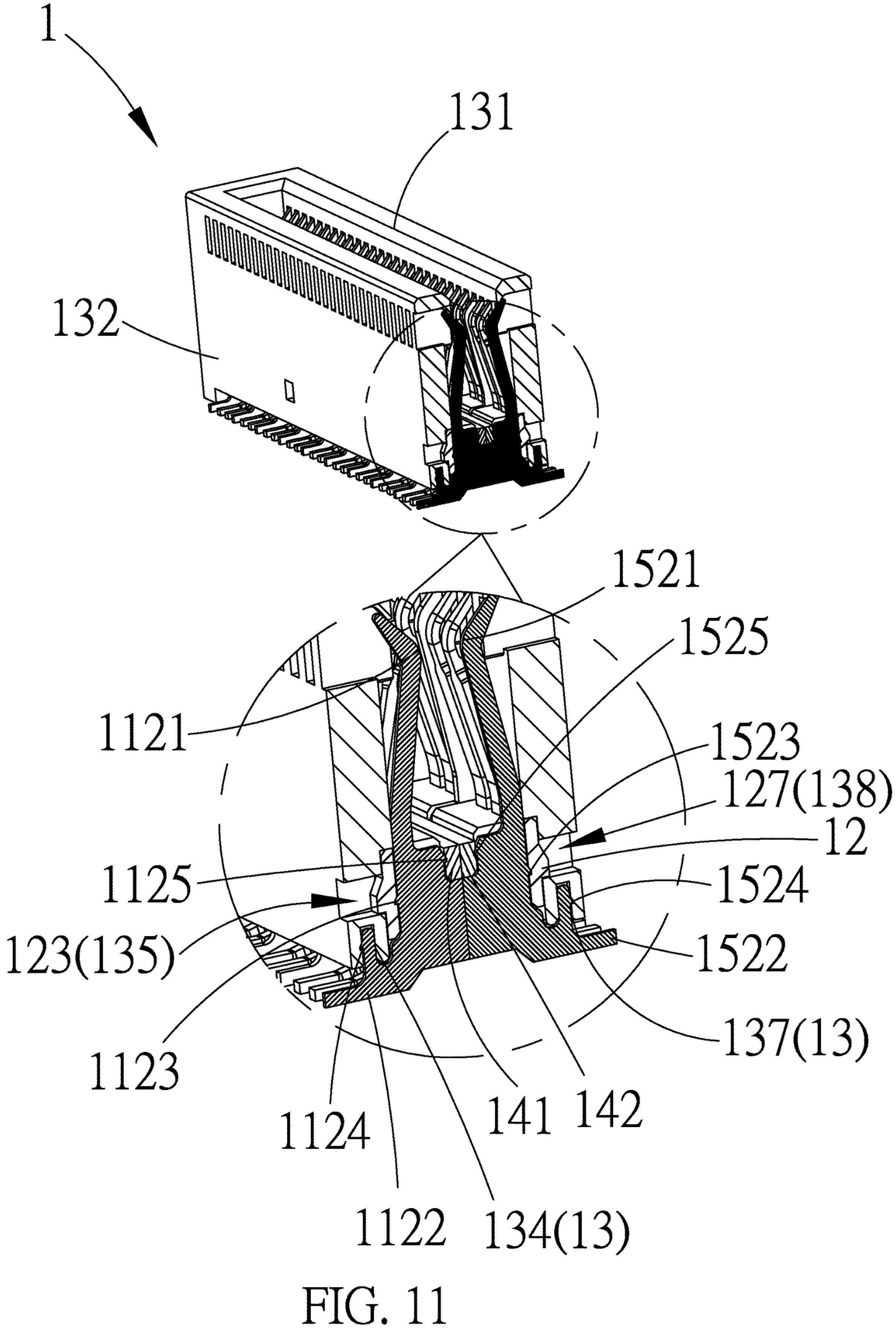
FIG. 11 is a cross-sectional view schematic diagram showing preferred embodiment of a connector assembly according to the present invention.
Figure 12:
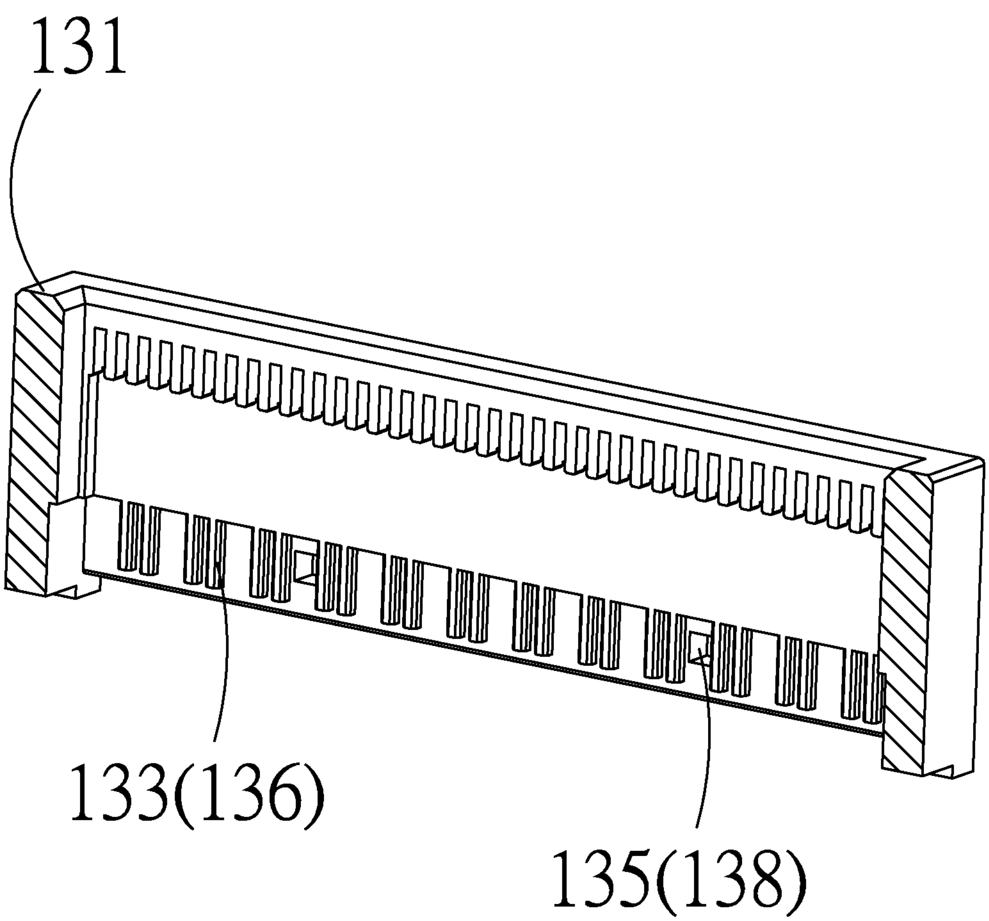
FIG. 12 is a cross-sectional view schematic diagram showing preferred of an embodiment outer insulation terminal block of a connector assembly according to the present invention.

As shown in FIG. 11, the inner insulation terminal block 12 has an inner insulation terminal block primary fastening structure 123, and correspondingly, the outer insulation terminal block 13 has an outer insulation terminal block primary fastening structure 135. The inner insulation terminal block primary fastening structure 123 can be a hook for being hooked to the outer insulation terminal block primary fastening structure 135 such as a hook slot, so as to keep the inner insulation terminal block 12 in the outer insulation terminal block 13.

Moreover, the inner insulation terminal block 12 has an inner insulation terminal block secondary fastening structure 127, and correspondingly, the outer insulation terminal block 13 has an outer insulation terminal block secondary fastening structure 138. The inner insulation terminal block secondary fastening structure 127 can be a hook for being hooked to the outer insulation terminal block secondary secondary fastening structure 138 such as a hook slot, so as to keep the inner insulation terminal block 12 in the outer insulation terminal block 13.

As shown in FIG. 4, the inner insulation terminal block 12 has an inner insulation terminal block primary gap structure 124 and an inner insulation terminal block secondary gap structure 128. The inner insulation terminal block primary gap structure 124 is located near the primary first conductive terminal 111 to form at least one gap between the inner insulation terminal block 12 and the primary first conductive terminal 111 to achieve an adequate impedance value of signal transmission for the primary first conductive terminal 111. The inner insulation terminal block secondary gap structure 128 is located near the secondary first conductive terminal 151 to form at least one gap between the inner insulation terminal block 12 and the secondary first conductive terminal 111 to achieve an adequate impedance value of signal transmission for the secondary first conductive terminal 151.

As shown in FIG. 5, the primary terminal set 11 includes a plurality of primary second conductive terminals 112, and the secondary terminal set 15 includes a plurality of secondary second conductive terminals 152. The primary jumper conductor 141 includes a primary jumper conductor insertion structure 1411 and can be a plastic conductor or metallic conductor. The secondary jumper conductor 142 includes a secondary jumper conductor insertion structure 1421 and can be a plastic conductor or metallic conductor. The primary jumper conductor insertion structure 1411 and the secondary jumper conductor insertion structure 1421 can be inserted respectively to the inner insulation terminal block 12 so as to allow the primary jumper conductor 141 and the secondary jumper conductor 142 to be embedded in the inner insulation terminal block 12 respectively.

It should be noted that, the inner insulation terminal block 12 allows the primary jumper conductor 141 to go over the primary first conductive terminal 111 and allows the secondary jumper conductor 142 to go over the secondary first conductive terminal 151. Each of the primary second conductive terminals 112 has a primary second conductive terminal abutting structure 1125 for going through the inner insulation terminal block 12 and abutting the primary jumper conductor 141 so as to allow the primary jumper conductor 141 to bridge and link the plurality of primary second conductive terminals 112, making them electrically interconnected to form a primary second conductive circuit. Each of the secondary second conductive terminals 152 has a secondary second conductive terminal abutting structure 1525 for going through the inner insulation terminal block 12 and abutting the secondary jumper conductor 142 so as to allow the secondary jumper conductor 142 to bridge and link the plurality of secondary second conductive terminals 152, making them electrically interconnected to form a secondary second conductive circuit.

The primary second conductive circuit and the secondary second conductive circuit can transmit grounding signals according to customized requirements for the connector assembly. Thus, the present invention can achieve electrical connection between at least partial conductive terminals on the connector assembly, with no need of any additional jumper, such that an electronic device using such a connector assembly can be made compact in size desirably.

Figure 23:
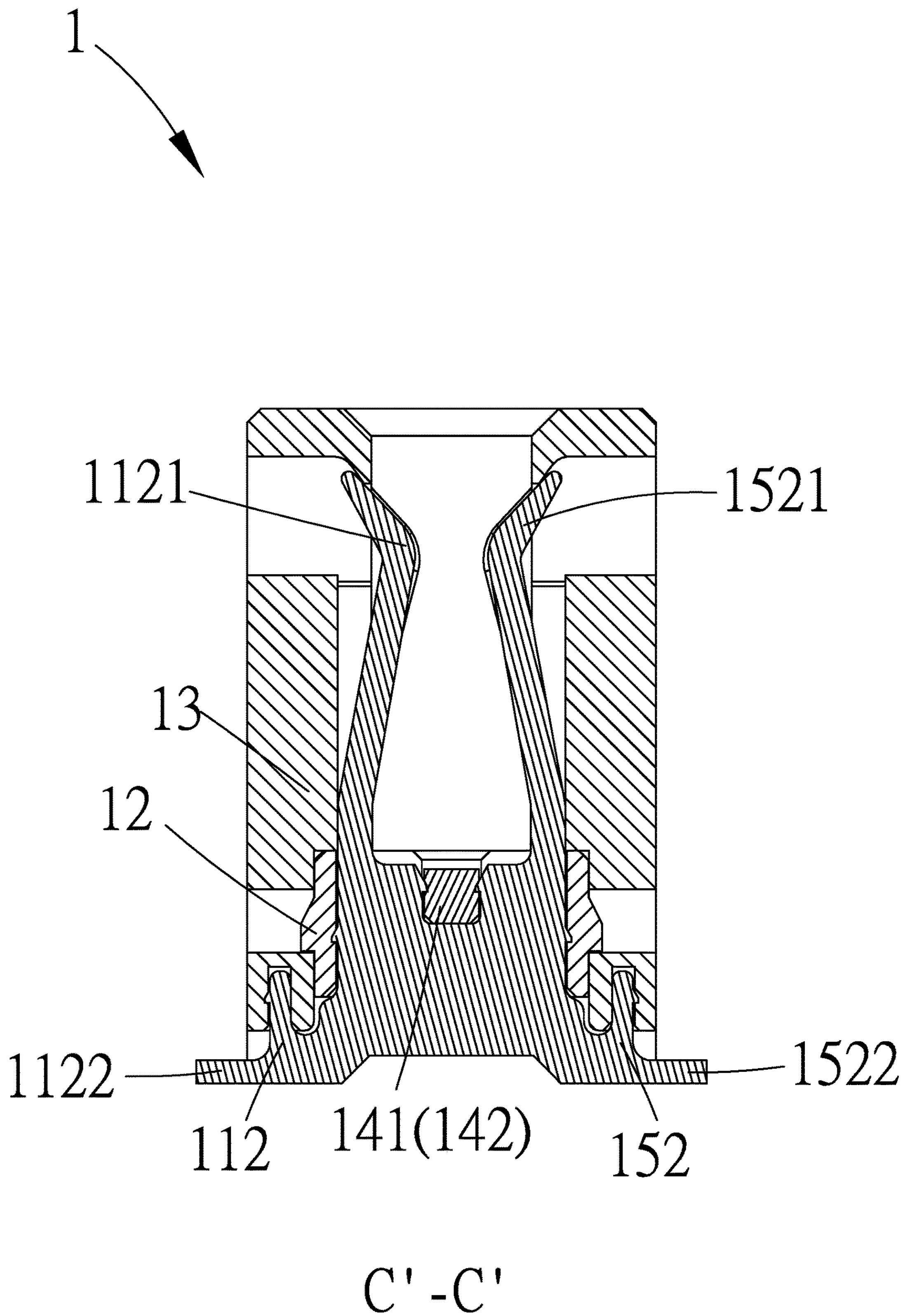
FIG. 23 is a cross-sectional view schematic diagram showing preferred embodiment of a connector assembly according to the present invention.

As shown in FIG. 23, the primary jumper conductor 141 and the secondary jumper conductor 142 are integrally formed, and the primary second conductive terminal 112 and the secondary second conductive terminal 152 are integrally formed, making the primary second conductive circuit electrically connected to the secondary second conductive circuit.

The present invention also proposes an assembly method of the connector assembly to be described with reference to embodiments shown in FIGS. 15 to 20.

Figure 15:
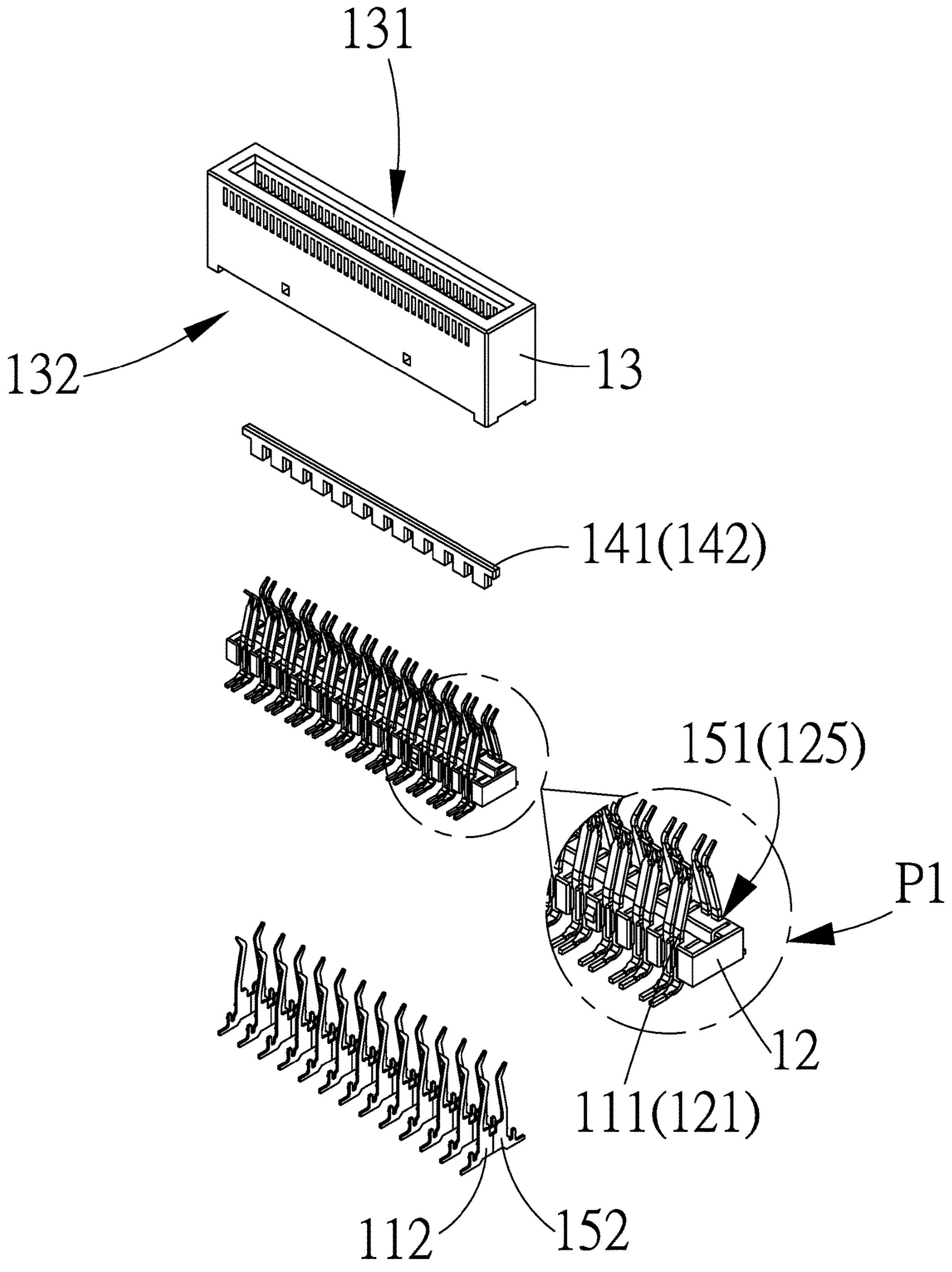
FIG. 15 is an assembly view schematic diagram showing preferred embodiment of a connector assembly according to the present invention.
Figure 16:
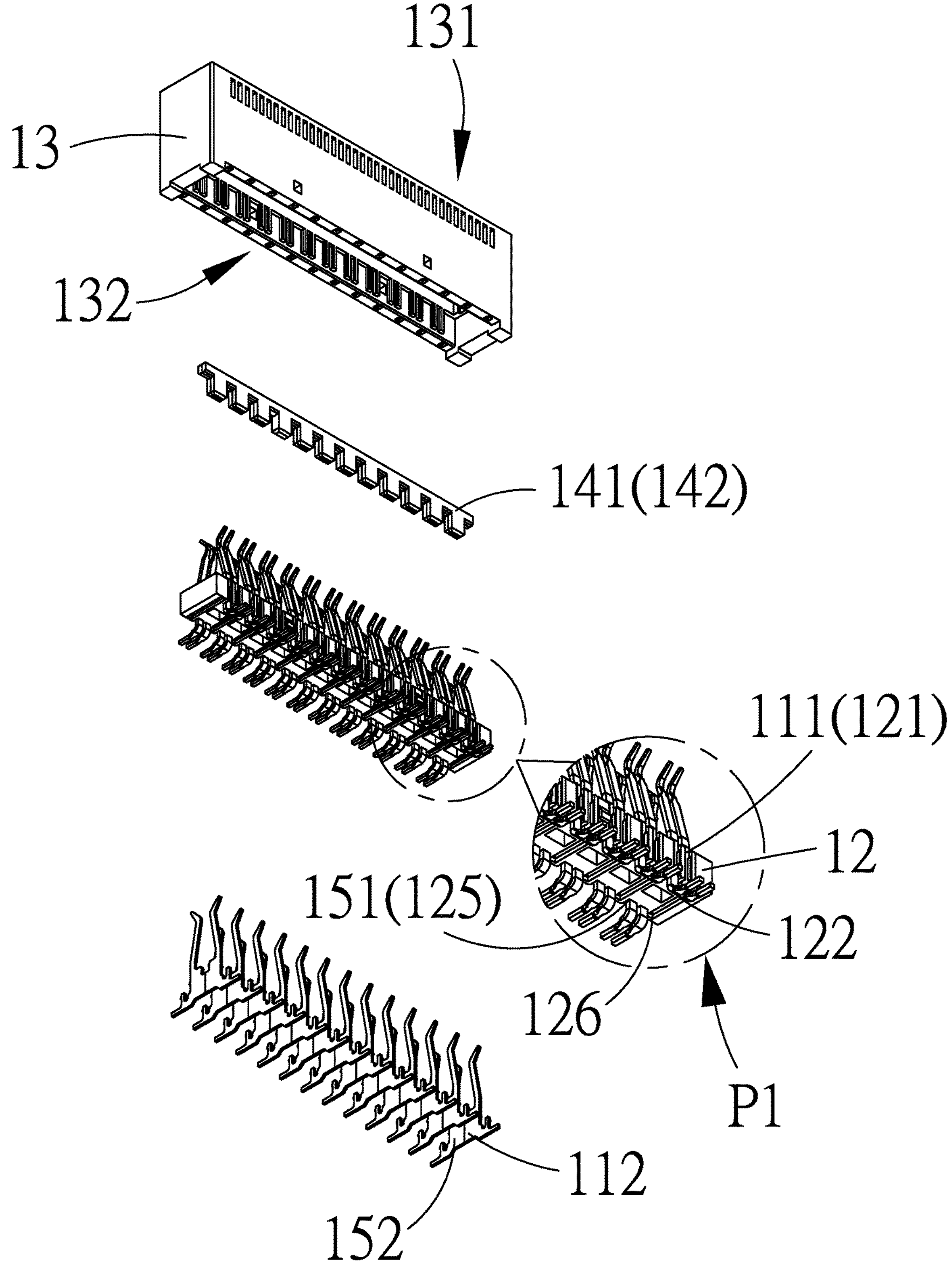
FIG. 16 is an assembly view schematic diagram showing preferred embodiment of a connector assembly according to the present invention.

First, as shown in FIGS. 15 to 16, the inner insulation terminal block 12 is used to grasp and position the primary first conductive terminal 111 and the secondary first conductive terminal 151, to form a first connector assembly semi-finished product P1 composed of the inner insulation terminal block 12, the primary first conductive terminal 111 and the secondary first conductive terminal 151.

Figure 17:
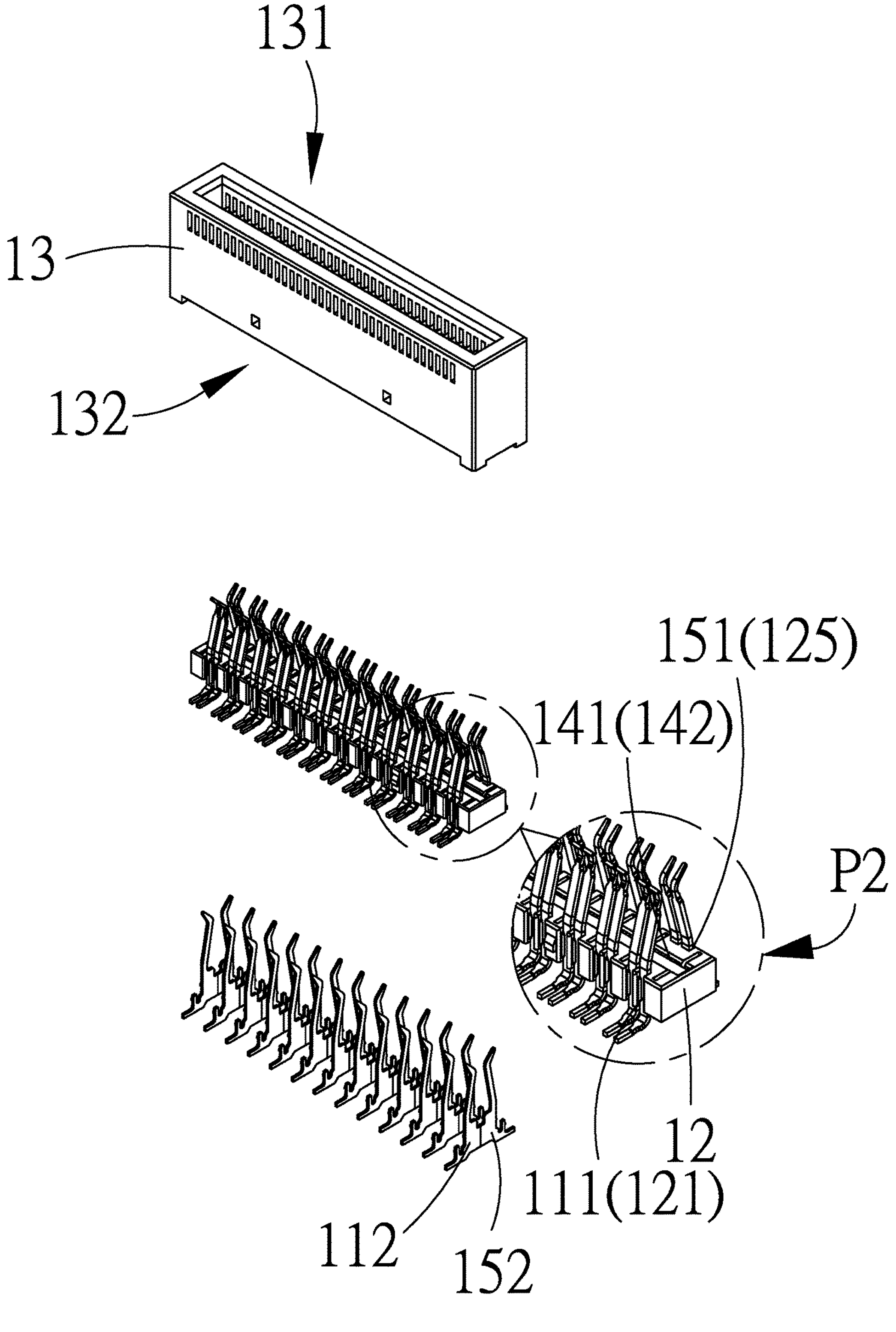
FIG. 17 is an assembly view schematic diagram showing preferred embodiment of a connector assembly according to the present invention.
Figure 18:
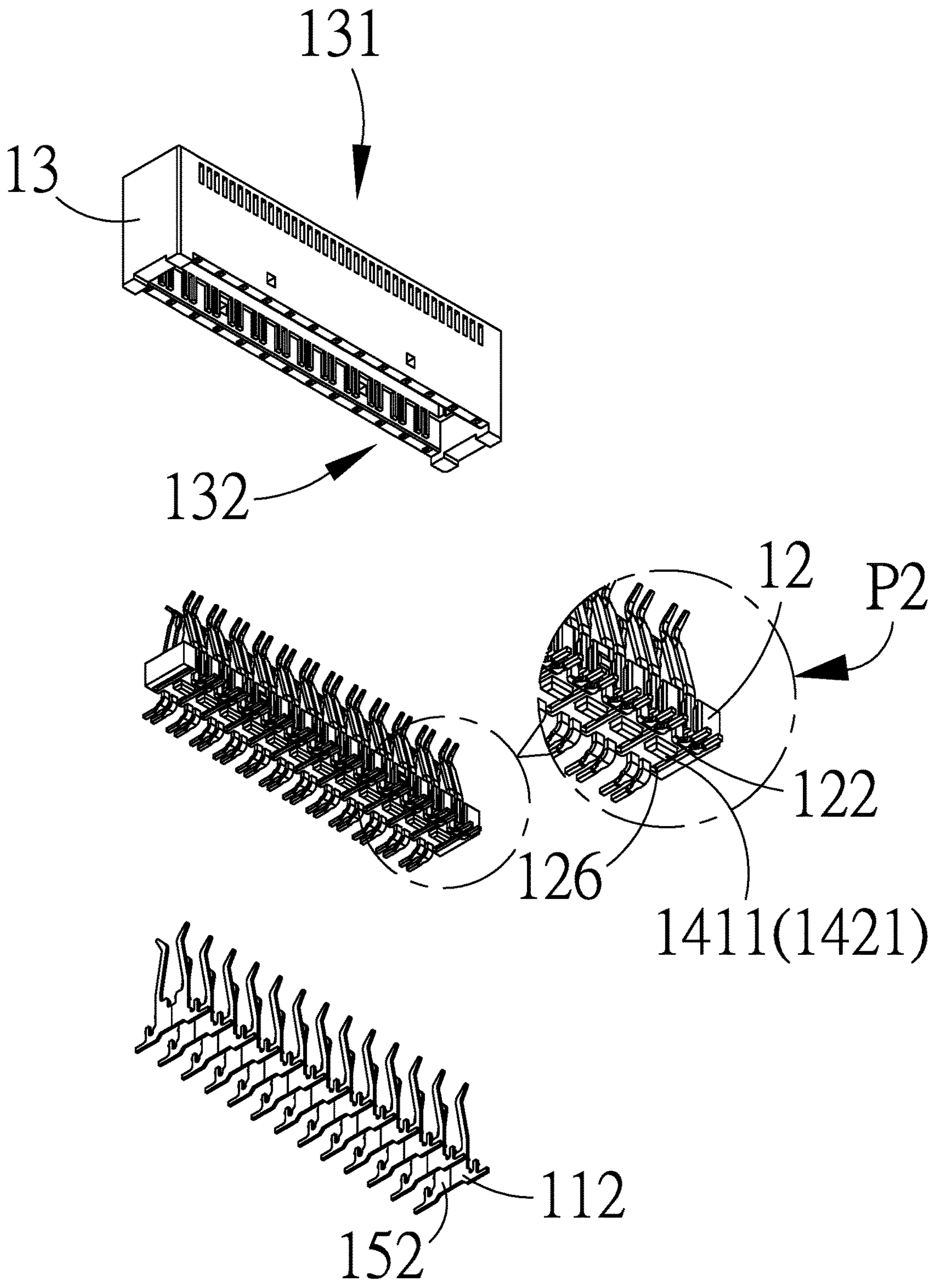
FIG. 18 is an assembly view schematic diagram showing preferred embodiment of a connector assembly according to the present invention.

Then, as shown in FIGS. 17 to 18, the primary jumper conductor 141 and the secondary jumper conductor 142 are embedded in the inner insulation terminal block 12 of the first connector assembly semi-finished product P1, to form a second connector assembly semi-finished product P2 composed of the primary jumper conductor 141, the secondary jumper conductor 142 and the first connector assembly semi-finished product P1.

Figure 19:
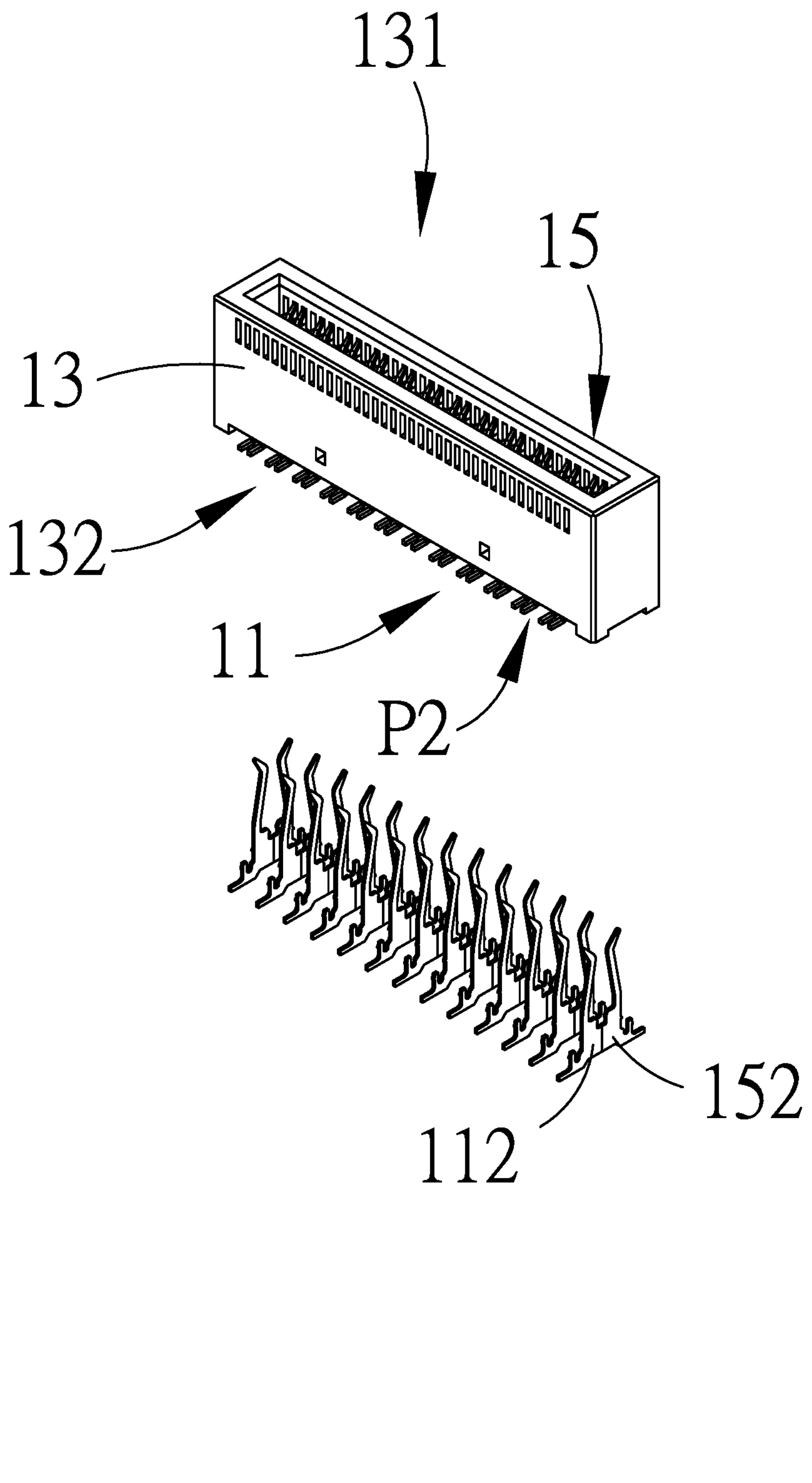
FIG. 19 is an assembly view schematic diagram showing preferred embodiment of a connector assembly according to the present invention.
Figure 20:
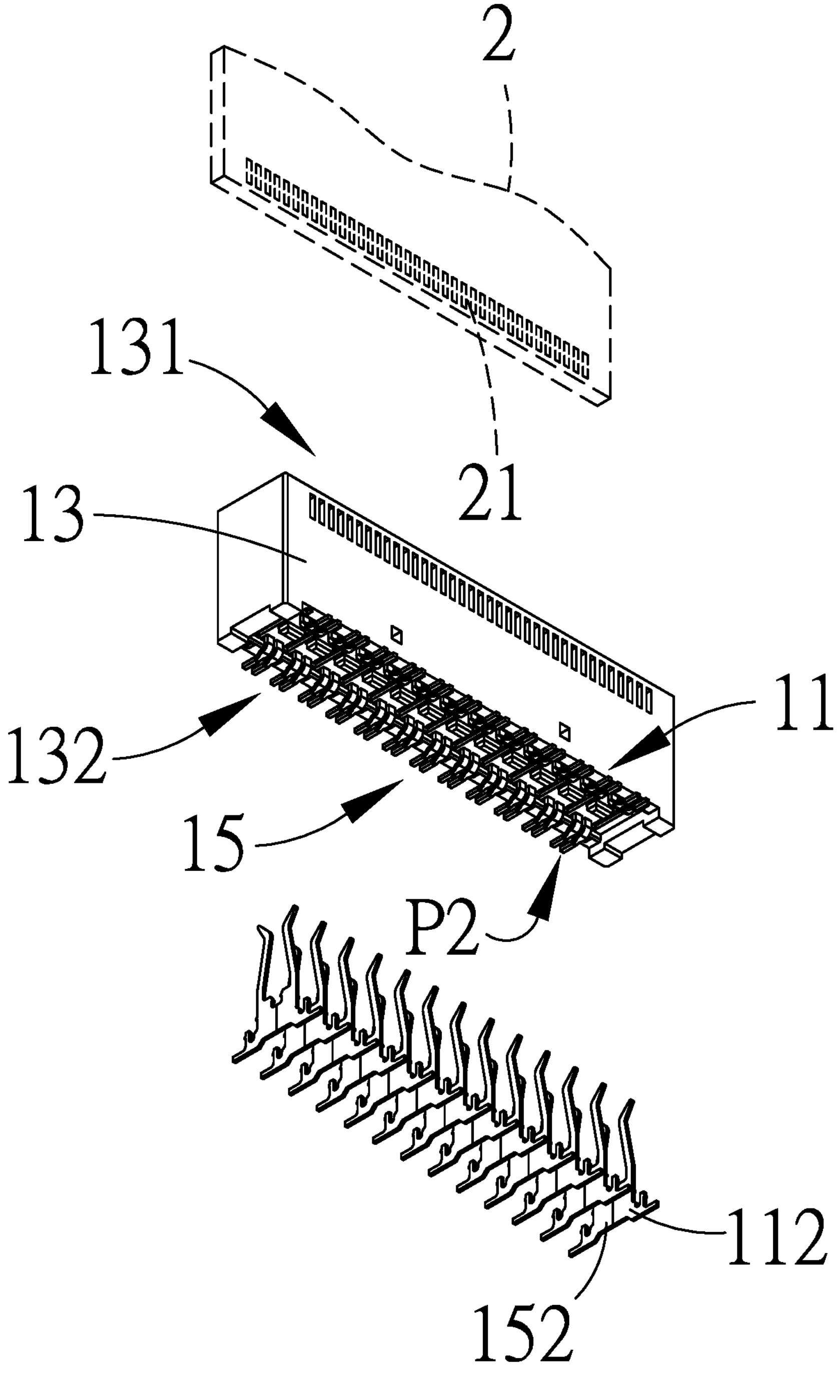
FIG. 20 is an assembly view schematic diagram showing preferred embodiment of a connector assembly according to the present invention.

Then, as shown in FIGS. 19 to 20, the inner insulation terminal block 12 of the second connector assembly semi-finished product P2 is used to position the primary second conductive terminal 112 and the secondary second conductive terminal 152 respectively in a manner that, the primary second conductive terminal 112 and the secondary second conductive terminal 152 can respectively provide shielding for the primary first conductive terminal 111 and the secondary first conductive terminal 151, so as to reduce any effect of external interference on signal transmission of the primary first conductive terminal 111 and the secondary first conductive terminal 151 and thus satisfy signal transmission requirements for the connector assembly.

Moreover, the primary jumper conductor 141 goes over the primary first conductive terminals 111 to be connected to the primary second conductive terminals 112, making the primary second conductive terminals 112 form a primary second conductive circuit. The secondary jumper conductor 142 goes over the secondary first conductive terminals 151 to be connected to the secondary second conductive terminals 152, making the secondary second conductive terminals 152 form a secondary second conductive circuit.

It should be noted that the foregoing embodiments of the connector assembly of the present application can also omit some components, for example, the outer insulation terminal block, the primary jumper conductor, the secondary jumper conductor and the secondary terminal set. That is to say, in the embodiment of the present application, the connector assembly may optionally include only the primary terminal set and the inner insulation terminal block.

The primary terminal set is defined with a primary terminal set projection plane. The primary terminal set includes at least one primary first conductive terminal and at least one primary second conductive terminal. The primary first conductive terminal has a primary first conductive terminal coupling structure and a primary first conductive terminal bonding structure. The primary second conductive terminal has a primary second conductive terminal coupling structure and a primary second conductive terminal bonding structure.

The inner insulation terminal block includes an inner insulation terminal block primary first positioning structure and an inner insulation terminal block primary second positioning structure. The inner insulation terminal block primary first positioning structure can be a snap structure for gripping and positioning the primary first conductive terminal to allow the primary first conductive terminal to be situated at a predetermined position and extended in a direction parallel to the primary terminal set projection plane, the inner insulation terminal block primary second positioning structure can be a snap structure for gripping and positioning the primary second conductive terminal to allow the primary second conductive terminal to be situated at a predetermined position and extended in a direction parallel to the primary terminal set projection plane, such that the primary first conductive terminal coupling structure can provide signal transmission for the coupling portion of the coupling component, and the primary first conductive terminal bonding structure can provide the bonding portion of the bonding component.

The inner insulation terminal block secondary first positioning structure provides to position the secondary first conductive terminal to allow the secondary first conductive terminal to be situated at a predetermined position and extended in a direction parallel to the secondary terminal set projection plane, such that the secondary first conductive terminal coupling structure can provide signal transmission for the coupling portion of the coupling component, and the secondary first conductive terminal bonding structure can provide the bonding portion of the bonding component.

Moreover, the primary first conductive terminal has a primary first conductive terminal projection area on the primary terminal set projection plane, and the primary second conductive terminal has a primary second conductive terminal projection area on the primary terminal set projection plane, wherein the primary second conductive terminal projection area is larger than the primary first conductive terminal projection area, and thus the primary second conductive terminal can act as a shield for the primary first conductive terminal to reduce any effect of external interference on signal transmission of the primary first conductive terminal so as to meet signal transmission requirements for the connector assembly.

Therefore, the connector assembly provided by the present invention allows a conductive terminal to provide shielding to reduce any effect of external interference on signal transmission of the connector assembly so as to meet signal transmission requirements for the connector assembly, and with the use of a jumper conductor, at least partial conductive terminals on the connector assembly can be electrically interconnected with no need of any additional jumper, such that an electronic device using such connector assembly can be made compact in size desirably.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A connector assembly for being coupled to a coupling component and bonded to a bonding component, the coupling component having a coupling portion, and the bonding component having a bonding portion, the connector assembly including:

a primary terminal set, with a primary terminal set projection plane being defined, the primary terminal set including at least one primary first conductive terminal and at least one primary second conductive terminal, wherein the primary first conductive terminal has a primary first conductive terminal coupling structure and a primary first conductive terminal bonding structure, and the primary second conductive terminal has a primary second conductive terminal coupling structure and a primary second conductive terminal bonding structure;

an inner insulation terminal block including an inner insulation terminal block primary first positioning structure and an inner insulation terminal block primary second positioning structure, wherein, the inner insulation terminal block primary first positioning structure is for positioning the primary first conductive terminal in a manner that the primary first conductive terminal is held at a predetermined position and extended in a direction parallel to the primary terminal set projection plane, so as to allow the primary first conductive terminal coupling structure to be coupled to the coupling portion of the coupling component and allow the primary first conductive terminal bonding structure to be bonded to the bonding portion of the bonding component;

the inner insulation terminal block primary second positioning structure is for positioning the primary second conductive terminal in a manner that the primary second conductive terminal is held at a predetermined position and extended in a direction parallel to the primary terminal set projection plane, so as to allow the primary second conductive terminal coupling structure to be coupled to the coupling portion of the coupling component and allow the primary second conductive terminal bonding structure to be bonded to the bonding portion of the bonding component;

the primary first conductive terminal coupling structure has a first conductive terminal projection area on the primary terminal set projection plane, and the primary second conductive terminal coupling structure has a second conductive terminal projection area on the primary terminal set projection plane, wherein the second conductive terminal projection area is larger than the first conductive terminal projection area to allow the primary second conductive terminal to provide shielding for the primary first conductive terminal and reduce any effect of external interference on signal transmission of the primary first conductive terminal;

wherein the inner insulation terminal block has an inner insulation terminal block primary gap structure located near the primary first conductive terminal to form at least one gap between the inner insulation terminal block and the primary first conductive terminal and allow an adequate impedance value of signal transmission for the primary first conductive terminal;

a primary jumper conductor, and wherein the at least one primary second conductive terminal includes a plurality of primary second conductive terminals, each of the primary second conductive terminals having a primary second conductive terminal abutting structure, wherein the primary jumper conductor is embedded in the inner insulation terminal block in a manner that the primary jumper conductor goes over the primary first conductive terminal, and the primary second conductive terminal abutting structure goes through the inner insulation terminal block to abut the primary jumper conductor, so as to allow the primary jumper conductor to bridge and link the plurality of primary second conductive terminals, making them electrically interconnected to form a primary second conductive circuit;

a secondary terminal set, with a secondary terminal set projection plane being defined, the secondary terminal set including at least one secondary first conductive terminal and at least one secondary second conductive terminal, wherein the secondary first conductive terminal has a secondary first conductive terminal coupling structure and a secondary first conductive terminal bonding structure, and the secondary second conductive terminal has a secondary second conductive terminal coupling structure and a secondary second conductive terminal bonding structure;

the inner insulation terminal block further including an inner insulation terminal block secondary first positioning structure and an inner insulation terminal block secondary second positioning structure, wherein, the inner insulation terminal block secondary first positioning structure is for positioning the secondary first conductive terminal in a manner that the secondary first conductive terminal is held at a predetermined position and extended in a direction parallel to the secondary terminal set projection plane, so as to allow the secondary first conductive terminal coupling structure to be coupled to the coupling portion of the coupling component, and allow the secondary first conductive terminal bonding structure to be bonded to the bonding portion of the bonding component;

the inner insulation terminal block secondary second positioning structure is for positioning the secondary second conductive terminal in a manner that the secondary second conductive terminal is held at a predetermined position and extended in a direction parallel to the secondary terminal set projection plane, so as to allow the secondary second conductive terminal coupling structure to be coupled to the coupling portion of the coupling component, and allow the secondary second conductive terminal bonding structure to be bonded to the bonding portion of the bonding component;

the secondary first conductive terminal has a secondary first conductive terminal projection area on the secondary terminal set projection plane, and the secondary second conductive terminal has a secondary second conductive terminal projection area on the secondary terminal set projection plane, wherein the secondary second conductive terminal projection area is larger than the secondary first conductive terminal projection area, allowing the secondary second conductive terminal to provide shielding for the secondary first conductive terminal, so as to reduce any effect of external interference on signal transmission of the secondary first conductive terminal; and an outer insulation terminal block having an outer insulation terminal block head structure and an outer insulation terminal block tail structure, and wherein the secondary second conductive terminal further includes a secondary second conductive terminal inner embedding structure and a secondary second conductive terminal outer embedding structure, wherein the secondary second conductive terminal outer embedding structure is for being embedded with the outer insulation terminal block, and the secondary second conductive terminal inner embedding structure is for being embedded with the inner insulation terminal block, so as to position the outer insulation terminal block and the inner insulation terminal block in a manner that, the secondary first conductive terminal coupling structure and the secondary second conductive terminal coupling structure are located at the outer insulation terminal block head structure to be able to couple the coupling portion of the coupling component, and the secondary first conductive terminal bonding structure and the secondary second conductive terminal bonding structure are located at the outer insulation terminal block tail structure to be able to bond the bonding portion of the bonding component;

wherein the outer insulation terminal block further includes an outer insulation terminal block secondary first positioning structure and an outer insulation terminal block secondary second positioning structure, wherein the outer insulation terminal block secondary first positioning structure is for positioning the secondary first conductive terminal to fix it at a predetermined position, and the outer insulation terminal block secondary second positioning structure is for positioning the secondary second conductive terminal to fix it at a predetermined position;

wherein the inner insulation terminal block secondary first positioning structure is a snap structure for gripping and positioning the secondary first conductive terminal, the inner insulation terminal block secondary second positioning structure is a slot structure for allowing the secondary second conductive terminal to be inserted and positioned, the outer insulation terminal block secondary first positioning structure is an abutting structure for abutting and positioning the secondary first conductive terminal, and the outer insulation terminal block secondary second positioning structure is a slot structure for allowing the secondary second conductive terminal to be inserted and positioned.

* * * * *